United States Patent
Niebla, Jr. et al.

(10) Patent No.: US 9,438,878 B2
(45) Date of Patent: Sep. 6, 2016

(54) METHOD OF CONVERTING 2D VIDEO TO 3D VIDEO USING 3D OBJECT MODELS

(71) Applicant: LEGEND3D, Inc., Carlsbad, CA (US)

(72) Inventors: Vicente Niebla, Jr., Ontario (CA);
Tony Baldridge, San Diego, CA (US);
Thomas Schad, San Diego, CA (US);
Scott Jones, San Diego, CA (US)

(73) Assignee: LEGEND3D, Inc., Carlsbad, CA (US)

( * ) Notice: Subject to any disclaimer, the term of this patent is extended or adjusted under 35 U.S.C. 154(b) by 0 days.

(21) Appl. No.: 14/857,704

(22) Filed: Sep. 17, 2015

(65) Prior Publication Data

US 2016/0005228 A1   Jan. 7, 2016

Related U.S. Application Data

(63) Continuation-in-part of application No. 13/874,625, filed on May 1, 2013, now Pat. No. 9,241,147.

(51) Int. Cl.
*G06K 9/00* (2006.01)
*H04N 13/00* (2006.01)
*H04N 13/02* (2006.01)

(52) U.S. Cl.
CPC ...... *H04N 13/0022* (2013.01); *H04N 13/0018* (2013.01); *H04N 13/026* (2013.01)

(58) Field of Classification Search
None
See application file for complete search history.

(56) References Cited

U.S. PATENT DOCUMENTS

| | | |
|---|---|---|
| 2,593,925 A | 4/1952 | Sheldon |
| 2,799,722 A | 7/1957 | Neugebauer |
| 2,804,500 A | 8/1957 | Giacoletto |
| 2,874,212 A | 2/1959 | Bechley |
| 2,883,763 A | 4/1959 | Schaper |
| 2,974,190 A | 3/1961 | Geiger |
| 3,005,042 A | 10/1961 | Horsley |
| 3,258,528 A | 6/1966 | Oppenheimer |

(Continued)

FOREIGN PATENT DOCUMENTS

| | | |
|---|---|---|
| DE | 003444353 | 12/1986 |
| EP | 0302454 | 2/1989 |

(Continued)

OTHER PUBLICATIONS

A novel method for Semi-automatic 2D to 3D Video Conversion, Wu et al., IEEE, 978-1-4244-1755-1, 2008, pp. 65-68.*

(Continued)

*Primary Examiner* — Jayesh A Patel
(74) *Attorney, Agent, or Firm* — Arc IP Law, PC; Joseph J. Mayo

(57) ABSTRACT

Method for converting 2D video to 3D video using 3D object models. Embodiments of the invention obtain a 3D object model for one or more objects in a 2D video scene, such as a character. Object models may for example be derived from 3D scanner data; planes, polygons, or surfaces may be fit to this data to generate a 3D model. In each frame in which a modeled object appears, the location and orientation of the 3D model may be determined in the frame, and a depth map for the object may be generated from the model. 3D video may be generated using the depth map. Embodiments may use feature tracking to automatically determine object location and orientation. Embodiments may use rigged 3D models with degrees of freedom to model objects with parts that move relative to one another.

20 Claims, 30 Drawing Sheets
(16 of 30 Drawing Sheet(s) Filed in Color)

(56) References Cited

U.S. PATENT DOCUMENTS

| | | |
|---|---|---|
| 3,486,242 A | 12/1969 | Aronson |
| 3,551,589 A | 12/1970 | Moskovitz |
| 3,558,811 A | 1/1971 | Barton et al. |
| 3,560,644 A | 2/1971 | Palmer et al. |
| 3,595,987 A | 7/1971 | Vlahos |
| 3,603,962 A | 9/1971 | Lechner |
| 3,612,755 A | 10/1971 | Tadlock |
| 3,617,626 A | 11/1971 | Bluth et al. |
| 3,619,051 A | 11/1971 | Wright |
| 3,621,127 A | 11/1971 | Hope |
| 3,647,942 A | 3/1972 | Siegel et al. |
| 3,673,317 A | 6/1972 | Kennedy et al. |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reifflel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Dalke et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingemann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka et al. |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,055,939 A | 10/1991 | Karamon et al. |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,243,460 A | 9/1993 | Kornberg |
| 5,252,953 A | 10/1993 | Sandrew et al. |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,363,476 A | 11/1994 | Kurashige et al. |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,668,605 A | 9/1997 | Nachshon et al. |
| 5,673,081 A | 9/1997 | Yamashita et al. |
| 5,682,437 A | 10/1997 | Okino et al. |
| 5,684,715 A | 11/1997 | Palmer |
| 5,699,443 A | 12/1997 | Murata et al. |
| 5,699,444 A | 12/1997 | Palm |
| 5,717,454 A | 2/1998 | Adolphi et al. |
| 5,729,471 A | 3/1998 | Jain et al. |
| 5,734,915 A | 3/1998 | Roewer |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,777,666 A | 7/1998 | Tanase et al. |
| 5,778,108 A | 7/1998 | Coleman |
| 5,784,175 A | 7/1998 | Lee |
| 5,784,176 A | 7/1998 | Narita |
| 5,808,664 A | 9/1998 | Yamashita et al. |
| 5,825,997 A | 10/1998 | Yamada et al. |
| 5,835,163 A | 11/1998 | Liou et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |
| 5,990,900 A | 11/1999 | Seago |
| 5,990,903 A | 11/1999 | Donovan |
| 5,999,660 A | 12/1999 | Zorin et al. |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,108,005 A | 8/2000 | Starks et al. |
| 6,118,584 A | 9/2000 | Van Berkel et al. |

(56) References Cited

U.S. PATENT DOCUMENTS

| | | |
|---|---|---|
| 6,119,123 A | 9/2000 | Dimitrova et al. |
| 6,132,376 A | 10/2000 | Hossack et al. |
| 6,141,433 A | 10/2000 | Moed et al. |
| 6,157,747 A | 12/2000 | Szeliski |
| 6,166,744 A | 12/2000 | Jaszlics et al. |
| 6,173,328 B1 | 1/2001 | Sato |
| 6,184,937 B1 | 2/2001 | Williams et al. |
| 6,198,484 B1 | 3/2001 | Kameyama |
| 6,201,900 B1 | 3/2001 | Hossack et al. |
| 6,208,348 B1 | 3/2001 | Kaye |
| 6,211,941 B1 | 4/2001 | Erland |
| 6,215,516 B1 | 4/2001 | Ma et al. |
| 6,222,948 B1 | 4/2001 | Hossack et al. |
| 6,226,015 B1 | 5/2001 | Danneels et al. |
| 6,228,030 B1 | 5/2001 | Urbano et al. |
| 6,263,101 B1 | 7/2001 | Klein |
| 6,271,859 B1 | 8/2001 | Asente |
| 6,314,211 B1 | 11/2001 | Kim et al. |
| 6,329,963 B1 | 12/2001 | Chiabrera |
| 6,337,709 B1 | 1/2002 | Yamaashi et al. |
| 6,360,027 B1 | 3/2002 | Hossack et al. |
| 6,363,170 B1 | 3/2002 | Seitz et al. |
| 6,364,835 B1 | 4/2002 | Hossack et al. |
| 6,373,970 B1 | 4/2002 | Dong et al. |
| 6,390,980 B1 | 5/2002 | Peterson et al. |
| 6,405,366 B1 | 6/2002 | Lorenz et al. |
| 6,414,678 B1 | 7/2002 | Goddard et al. |
| 6,416,477 B1 | 7/2002 | Jago |
| 6,426,750 B1 | 7/2002 | Hoppe |
| 6,429,867 B1 | 8/2002 | Deering |
| 6,445,816 B1 | 9/2002 | Pettigrew |
| 6,456,340 B1 | 9/2002 | Margulis |
| 6,466,205 B2 | 10/2002 | Simpson et al. |
| 6,474,970 B1 | 11/2002 | Caldoro |
| 6,477,267 B1 | 11/2002 | Richards |
| 6,492,986 B1 | 12/2002 | Metaxas et al. |
| 6,496,598 B1 | 12/2002 | Harman |
| 6,509,926 B1 | 1/2003 | Mills et al. |
| 6,515,659 B1 | 2/2003 | Kaye et al. |
| 6,535,233 B1 | 3/2003 | Smith |
| 6,553,184 B1 | 4/2003 | Ando et al. |
| 6,590,573 B1 | 7/2003 | Geshwind |
| 6,606,166 B1 | 8/2003 | Knoll |
| 6,611,268 B1 | 8/2003 | Szeliski et al. |
| 6,650,339 B1 | 11/2003 | Silva et al. |
| 6,662,357 B1 | 12/2003 | Bowman-Amuah |
| 6,665,798 B1 | 12/2003 | McNally et al. |
| 6,677,944 B1 | 1/2004 | Yamamoto |
| 6,686,591 B2 | 2/2004 | Ito et al. |
| 6,686,926 B1 | 2/2004 | Kaye |
| 6,707,487 B1 | 3/2004 | Aman et al. |
| 6,727,938 B1 | 4/2004 | Randall |
| 6,737,957 B1 | 5/2004 | Petrovic et al. |
| 6,744,461 B1 | 6/2004 | Wada et al. |
| 6,765,568 B2 | 7/2004 | Swift et al. |
| 6,791,542 B2 | 9/2004 | Matusik et al. |
| 6,798,406 B1 | 9/2004 | Jones et al. |
| 6,813,602 B2 | 11/2004 | Thyssen |
| 6,847,737 B1 | 1/2005 | Kouri et al. |
| 6,850,252 B1 | 2/2005 | Hoffberg |
| 6,853,383 B2 | 2/2005 | Duquesnois |
| 6,859,523 B1 | 2/2005 | Jilk et al. |
| 6,919,892 B1 | 7/2005 | Cheiky et al. |
| 6,964,009 B2 | 11/2005 | Samaniego et al. |
| 6,965,379 B2 | 11/2005 | Lee et al. |
| 6,973,434 B2 | 12/2005 | Miller |
| 6,985,187 B2 | 1/2006 | Han et al. |
| 7,000,223 B1 | 2/2006 | Knutson et al. |
| 7,006,881 B1 | 2/2006 | Hoffberg et al. |
| 7,027,054 B1 | 4/2006 | Cheiky et al. |
| 7,032,177 B2 | 4/2006 | Novak et al. |
| 7,035,451 B2 | 4/2006 | Harman et al. |
| 7,079,075 B1 | 7/2006 | Connor et al. |
| 7,084,868 B2 * | 8/2006 | Farag ................. G06T 17/00 345/419 |
| 7,098,910 B2 | 8/2006 | Petrovic et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,117,231 B2 | 10/2006 | Fischer et al. |
| 7,123,263 B2 * | 10/2006 | Harvill ................. G06T 17/10 345/419 |
| 7,136,075 B1 | 11/2006 | Hamburg |
| 7,181,081 B2 | 2/2007 | Sandrew |
| 7,190,496 B2 | 3/2007 | Klug et al. |
| 7,254,264 B2 | 8/2007 | Naske et al. |
| 7,260,274 B2 | 8/2007 | Sawhney et al. |
| 7,272,265 B2 | 9/2007 | Kouri et al. |
| 7,298,094 B2 | 11/2007 | Yui |
| 7,308,139 B2 | 12/2007 | Wentland et al. |
| 7,321,374 B2 | 1/2008 | Naske |
| 7,327,360 B2 | 2/2008 | Petrovic et al. |
| 7,333,519 B2 | 2/2008 | Sullivan et al. |
| 7,333,670 B2 | 2/2008 | Sandrew |
| 7,343,082 B2 | 3/2008 | Cote et al. |
| 7,355,607 B2 * | 4/2008 | Harvill ................. G06T 17/10 345/420 |
| 7,461,002 B2 | 12/2008 | Crockett et al. |
| 7,512,262 B2 | 3/2009 | Criminisi et al. |
| 7,519,990 B1 | 4/2009 | Xie |
| 7,532,225 B2 | 5/2009 | Fukushima et al. |
| 7,538,768 B2 | 5/2009 | Kiyokawa et al. |
| 7,542,034 B2 * | 6/2009 | Spooner ................. G06T 15/20 345/419 |
| 7,558,420 B2 | 7/2009 | Era |
| 7,573,475 B2 | 8/2009 | Sullivan et al. |
| 7,573,489 B2 | 8/2009 | Davidson et al. |
| 7,576,332 B2 | 8/2009 | Britten |
| 7,577,312 B2 | 8/2009 | Sandrew |
| 7,610,155 B2 | 10/2009 | Timmis et al. |
| 7,624,337 B2 | 11/2009 | Sull et al. |
| 7,630,533 B2 | 12/2009 | Ruth et al. |
| 7,663,689 B2 | 2/2010 | Marks |
| 7,665,798 B2 | 2/2010 | Hsia et al. |
| 7,680,653 B2 | 3/2010 | Yeldener |
| 7,772,532 B2 | 8/2010 | Olsen et al. |
| 7,852,461 B2 | 12/2010 | Yahav |
| 7,860,342 B2 | 12/2010 | Levien et al. |
| 7,894,633 B1 | 2/2011 | Harman |
| 7,940,961 B2 | 5/2011 | Allen |
| 8,036,451 B2 | 10/2011 | Redert et al. |
| 8,085,339 B2 | 12/2011 | Marks |
| 8,090,402 B1 | 1/2012 | Fujisaki |
| 8,194,102 B2 | 6/2012 | Cohen |
| 8,213,711 B2 | 7/2012 | Tam et al. |
| 8,217,931 B2 | 7/2012 | Lowe et al. |
| 8,320,634 B2 | 11/2012 | Deutsch |
| 8,384,763 B2 | 2/2013 | Tam et al. |
| 8,401,336 B2 | 3/2013 | Baldridge et al. |
| 8,462,988 B2 | 6/2013 | Boon |
| 8,488,868 B2 | 7/2013 | Tam et al. |
| 8,526,704 B2 | 9/2013 | Dobbe |
| 8,543,573 B2 | 9/2013 | MacPherson |
| 8,634,072 B2 | 1/2014 | Trainer |
| 8,644,596 B1 * | 2/2014 | Wu ................. G06K 9/00201 382/154 |
| 8,698,798 B2 | 4/2014 | Murray et al. |
| 8,907,968 B2 | 12/2014 | Tanaka et al. |
| 8,922,628 B2 | 12/2014 | Bond |
| 2001/0025267 A1 | 9/2001 | Janiszewski |
| 2001/0051913 A1 | 12/2001 | Vashistha et al. |
| 2002/0001045 A1 | 1/2002 | Ranganath et al. |
| 2002/0048395 A1 | 4/2002 | Harman et al. |
| 2002/0049778 A1 | 4/2002 | Bell |
| 2002/0063780 A1 | 5/2002 | Harman et al. |
| 2002/0075384 A1 | 6/2002 | Harman |
| 2003/0018608 A1 | 1/2003 | Rice et al. |
| 2003/0046656 A1 | 3/2003 | Saxena |
| 2003/0069777 A1 | 4/2003 | Or-Bach |
| 2003/0093790 A1 | 5/2003 | Logan et al. |
| 2003/0097423 A1 | 5/2003 | Ozawa et al. |
| 2003/0154299 A1 | 8/2003 | Hamilton |
| 2003/0177024 A1 | 9/2003 | Tsuchida |
| 2004/0004616 A1 | 1/2004 | Konya et al. |

(56) References Cited

U.S. PATENT DOCUMENTS

| | | |
|---|---|---|
| 2004/0062439 A1 | 4/2004 | Cahill et al. |
| 2004/0181444 A1 | 9/2004 | Sandrew |
| 2004/0189796 A1 | 9/2004 | Ho et al. |
| 2004/0258089 A1 | 12/2004 | Derechin et al. |
| 2005/0088515 A1 | 4/2005 | Geng |
| 2005/0104878 A1 | 5/2005 | Kaye et al. |
| 2005/0146521 A1 | 7/2005 | Kaye et al. |
| 2005/0188297 A1 | 8/2005 | Knight et al. |
| 2005/0207623 A1 | 9/2005 | Liu et al. |
| 2005/0231501 A1 | 10/2005 | Nitawaki |
| 2005/0231505 A1 | 10/2005 | Kaye et al. |
| 2005/0280643 A1 | 12/2005 | Chen |
| 2006/0028543 A1 | 2/2006 | Sohn et al. |
| 2006/0061583 A1* | 3/2006 | Spooner .................. G06T 15/20 345/582 |
| 2006/0083421 A1 | 4/2006 | Weiguo et al. |
| 2006/0143059 A1 | 6/2006 | Sandrew |
| 2006/0159345 A1 | 7/2006 | Clary et al. |
| 2006/0274905 A1 | 12/2006 | Lindahl et al. |
| 2007/0052807 A1 | 3/2007 | Zhou et al. |
| 2007/0236514 A1 | 10/2007 | Agusanto et al. |
| 2007/0238981 A1 | 10/2007 | Zhu et al. |
| 2007/0260634 A1 | 11/2007 | Makela et al. |
| 2007/0279412 A1 | 12/2007 | Davidson et al. |
| 2007/0279415 A1 | 12/2007 | Sullivan et al. |
| 2007/0286486 A1 | 12/2007 | Goldstein |
| 2007/0296721 A1 | 12/2007 | Chang et al. |
| 2008/0002878 A1 | 1/2008 | Meiyappan |
| 2008/0044155 A1 | 2/2008 | Kuspa |
| 2008/0079851 A1 | 4/2008 | Stanger et al. |
| 2008/0117233 A1 | 5/2008 | Mather et al. |
| 2008/0147917 A1 | 6/2008 | Lees et al. |
| 2008/0162577 A1 | 7/2008 | Fukuda et al. |
| 2008/0181486 A1 | 7/2008 | Spooner et al. |
| 2008/0225040 A1 | 9/2008 | Simmons et al. |
| 2008/0225042 A1 | 9/2008 | Birtwistle et al. |
| 2008/0225045 A1* | 9/2008 | Birtwistle .............. G06T 7/0065 345/420 |
| 2008/0225059 A1 | 9/2008 | Lowe et al. |
| 2008/0226123 A1 | 9/2008 | Birtwistle |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0227075 A1 | 9/2008 | Poor et al. |
| 2008/0228449 A1* | 9/2008 | Birtwistle .............. G06T 7/0071 703/1 |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0002368 A1 | 1/2009 | Vitikainen et al. |
| 2009/0033741 A1 | 2/2009 | Oh et al. |
| 2009/0116732 A1 | 5/2009 | Zhou et al. |
| 2009/0219383 A1 | 9/2009 | Passmore |
| 2009/0256903 A1 | 10/2009 | Spooner et al. |
| 2009/0290758 A1 | 11/2009 | Ng-Thow-Hing et al. |
| 2009/0297061 A1* | 12/2009 | Mareachen .............. G06T 11/00 382/285 |
| 2009/0303204 A1 | 12/2009 | Nasiri |
| 2010/0026784 A1 | 2/2010 | Burazerovic |
| 2010/0045666 A1 | 2/2010 | Kommann |
| 2010/0166338 A1 | 7/2010 | Lee |
| 2010/0259610 A1 | 10/2010 | Petersen |
| 2011/0050864 A1 | 3/2011 | Bond |
| 2011/0069152 A1 | 3/2011 | Wang et al. |
| 2011/0074784 A1 | 3/2011 | Turner et al. |
| 2011/0096832 A1 | 4/2011 | Zhang et al. |
| 2011/0169827 A1 | 7/2011 | Spooner et al. |
| 2011/0169914 A1 | 7/2011 | Lowe et al. |
| 2011/0188773 A1 | 8/2011 | Wei et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0039525 A1 | 2/2012 | Tian et al. |
| 2012/0087570 A1 | 4/2012 | Seo et al. |
| 2012/0102435 A1 | 4/2012 | Han et al. |
| 2012/0188334 A1 | 7/2012 | Fortin et al. |
| 2012/0218382 A1 | 8/2012 | Zass |
| 2012/0249746 A1* | 10/2012 | Cornog .............. H04N 13/0022 348/47 |
| 2012/0274626 A1 | 11/2012 | Hsieh |
| 2012/0274634 A1* | 11/2012 | Yamada ................ G06T 7/0051 345/419 |
| 2012/0281906 A1 | 11/2012 | Appia |
| 2012/0306849 A1 | 12/2012 | Steen |
| 2012/0306874 A1* | 12/2012 | Nguyen .................. G06T 19/00 345/420 |
| 2013/0044192 A1 | 2/2013 | Mukherjee et al. |
| 2013/0051659 A1 | 2/2013 | Yamamoto |
| 2013/0063549 A1 | 3/2013 | Schnyder et al. |
| 2013/0234934 A1 | 9/2013 | Champion et al. |
| 2013/0258062 A1* | 10/2013 | Noh ................... H04N 13/0022 348/47 |

FOREIGN PATENT DOCUMENTS

| | | |
|---|---|---|
| EP | 1187494 | 4/2004 |
| EP | 1719079 | 11/2006 |
| GB | 2487039 A | 11/2012 |
| JP | 60-52190 | 3/1985 |
| JP | 2002123842 | 4/2002 |
| JP | 2003046982 | 2/2003 |
| JP | 2004207985 | 7/2004 |
| KR | 20120095059 | 8/2012 |
| KR | 20130061289 | 11/2013 |
| SU | 1192168 A | 9/1982 |
| WO | 9724000 | 7/1997 |
| WO | 9912127 | 3/1999 |
| WO | 9930280 | 6/1999 |
| WO | 0079781 | 12/2000 |
| WO | 0101348 | 1/2001 |
| WO | 0213143 | 2/2002 |
| WO | 2006078237 | 7/2006 |
| WO | 2007148219 | 12/2007 |
| WO | 2008075276 | 6/2008 |
| WO | 2011029209 | 9/2011 |
| WO | 2012016600 | 2/2012 |
| WO | 2013084234 | 6/2013 |

OTHER PUBLICATIONS

Converting 2D video to 3D: An efficient—Experience, Cao et al., IEEE, 1070-986X, 2011, pp. 12-17.*

"Nintendo DSi Uses Camera Face Tracking to Create 3D Mirages", retrieved from www.Gizmodo.com on Mar. 18, 2013, 3 pages.

Noll, Computer-Generated Three-Dimensional Movies, Computers and Automation, vol. 14, No. 11 (Nov. 1965), pp. 20-23.

Noll, Stereographic Projections by Digital Computer, Computers and Automation, vol. 14, No. 5 (May 1965), pp. 32-34.

Australian Office Action issued for 2002305387, dated Mar. 15, 2007, 2 page.

Canadian Office Action, Dec. 28, 2011, Appl No. 2,446,150, 4 pages.

Canadian Office Action, Oct. 8, 2010, App. No. 2,446,150, 6 pages.

Canadian Office Action, Jun. 13, 2011, App. No. 2,446,150, 4 pages.

Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.htm).

Declaration of Barbara Frederiksen in Support of In-Three, Inc's Opposition to Plaintiffs Motion for Preliminary Injunction, Aug. 1, 2005, *IMAX Corporation et al v. In-Three, Inc.*, Case No. CV05 1795 FMC (Mcx). (25 pages).

Declaration of John Marchioro, Exhibit C, 3 pages, Nov. 2, 2007.
Declaration of Michael F. Chou, Exhibit B, 12 pages, Nov. 2, 2007.
Declaration of Steven K. Feiner, Exhibit A, 10 pages, Nov. 2, 2007.

Di Zhong, Shih-Fu Chang, "AMOS: An Active System for MPEG-4 Video Object Segmentation," ICIP (2) 8: 647-651, Apr. 1998.

E. N. Mortensen and W. A. Barrett, "Intelligent Scissors for Image Composition," Computer Graphics (SIGGRAPH '95), pp. 191-198, Los Angeles, CA, Aug. 1995.

(56) References Cited

OTHER PUBLICATIONS

EPO Office Action issued for EP Appl. No. 02734203.9, dated Sep. 12, 2006, 4 pages.
EPO Office Action issued for EP Appl. No. 02734203.9, dated Oct. 7, 2010, 5 pages.
Eric N. Mortensen, William A. Barrett, "Interactive segmentation with Intelligent Scissors," Graphical Models and Image Processing, vol. 60 No. 5, p. 349-384, Sep. 2002.
Exhibit 1 to Declaration of John Marchioro, Revised translation of portions of Japanese Patent Document No. 60-52190 to Hiromae, 3 pages, Nov. 2, 2007.
Gao et al., Perceptual Motion Tracking from Image Sequences, IEEE, Jan. 2001, pp. 389-392.
Grossman, "Look Ma, No Glasses", Games, Apr. 1992, pp. 12-14.
Hanrahan et al., "Direct WYSIWYG painting and texturing on 3D shapes", Computer Graphics, vol. 24, Issue 4, pp. 215-223. Aug. 1990.
Zhong, et al., "Interactive Tracker—A Semi-automatic Video Object Tracking and Segmentation System," Microsoft Research China, http://research.microsoft.com (Aug. 26, 2003).
Indian Office Action issued for Appl. No. 49/DELNP/2005, dated Apr. 4, 2007, 9 pages.
Interpolation (from Wikipedia encyclopedia, article pp. 1-6) retrieved from Internet URL: http://en.wikipedia.org/wiki/Interpolation on Jun. 5, 2008.
IPER, Mar. 29, 2007, PCT/US2005/014348, 5 pages.
IPER, Oct. 5, 2012, PCT/US2011/058182, 6 pages.
International Search Report, Jun. 13, 2003, PCT/US02/14192, 4 pages.
PCT Search Report issued for PCT/US2011/058182, dated May 10, 2012, 8 pages.
PCT Search Report issued for PCT/US2011/067024, dated Aug. 22, 2012, 10 pages.
Izquierdo et al., Virtual 3D-View Generation from Stereoscopic Video Data, IEEE, Jan. 1998, pp. 1219-1224.
Jul. 21, 2005, Partial Testimony, Expert: Samuel Zhou, Ph.D., 2005 WL 3940225 (C.D.Cal.), 21 pages.
Kaufman, D., "The Big Picture", Apr. 1998, http://www.xenotech.com Apr. 1998, pp. 1-4.
Lenny Lipton, "Foundations of the Stereo-Scopic Cinema, a Study in Depth" With and Appendix on 3D Television, 325 pages, May 1978.
Lenny Lipton, Foundations of the Stereo-Scopic Cinema A Study in Depth, 1982, Van Nostrand Reinhold Company.
Machine translation of JP Patent No. 2004-207985, dated Jul. 22, 2008, 34 pg.
Michael Gleicher, "Image Snapping," SIGGRAPH: 183-190, Jun. 1995.
Murray et al., Active Tracking, IEEE International Conference on Intelligent Robots and Systems, Sep. 1993, pp. 1021-1028.
Ohm et al., An Object-Based System for Stereopscopic Viewpoint Synthesis, IEEE transaction on Circuits and Systems for Video Technology, vol. 7, No. 5, Oct. 1997, pp. 801-811.
Optical Reader (from Wikipedia encyclopedia, article p. 1) retrieved from Internet URL:http://en.wikipedia.org/wiki/Optical_reader on Jun. 5, 2008.
Selsis et al., Automatic Tracking and 3D Localization of Moving Objects by Active Contour Models, Intelligent Vehicles 95 Symposium, Sep. 1995, pp. 96-100.
Slinker et al., "The Generation and Animation of Random Dot and Random Line Autostereograms", Journal of Imaging Science and Technology, vol. 36, No. 3, pp. 260-267, May 1992.
Nguyen et al., Tracking Nonparameterized Object Contours in Video, IEEE Transactions on Image Processing, vol. 11, No. 9, Sep. 2002, pp. 1081-1091.

U.S. District Court, C.D. California, *IMAX Corporation and Three-Dimensional Media Group, Ltd.*, v. *In-Three, Inc.*, Partial Testimony, Expert: Samuel Zhou, Ph.D., No. CV 05-1795 FMC(Mcx), Jul. 19, 2005, WL 3940223 (C.D.Cal.), 6 pages.
U.S. District Court, C.D. California, *IMAX* v. *In-Three*, No. 05 CV 1795, 2005, Partial Testimony, Expert: David Geshwind, WestLaw 2005, WL 3940224 (C.D.Cal.), 8 pages.
U.S. District Court, C.D. California, Western Division, *IMAX Corporation, and Three-Dimensional Media Group, Ltd.* v. *In-Three, Inc.*, No. CV05 1795 FMC (Mcx). Jul. 18, 2005. Declaration of Barbara Frederiksen in Support of In-Three, Inc.'s Opposition to Plaintiffs' Motion for Preliminary Injunction, 2005 WL 5434580 (C.D.Cal.), 13 pages.
U.S. Patent and Trademark Office, Before the Board of Patent Appeals and Interferences, Ex Parte Three-Dimensional Media Group, Ltd., Appeal 2009-004087, Reexamination Control No. 90/007,578, U.S. Pat. No. 4,925,294, Decis200, 88 pages, Jul. 30, 2010.
Yasushi Mae, et al., "Object Tracking in Cluttered Background Based on Optical Flow and Edges," Proc. 13th Int. Conf. on Pattern Recognition, vol. 1, pp. 196-200, Apr. 1996.
PCT ISR, Feb. 27, 2007, PCT/US2005/014348, 8 pages.
PCT ISR, Sep. 11, 2007, PCT/US07/62515, 9 pages.
PCT ISR, Nov. 14, 2007, PCT/US07/62515, 24 pages.
PCT IPRP, Jul. 4, 2013, PCT/US2011/067024, 5 pages.
Weber, et al., "Rigid Body Segmentation and Shape Description from Dense Optical Flow Under Weak Perspective," IEEE Transactions on Pattern Analysis and Machine Intelligence, vol. 19, No. 2, Feb. 1997,pp. 139-143.
IPER, May 10, 2013, PCT/US2011/058182, 6 pages.
European Office Action dated Jun. 26, 2013, received for EP Appl. No. 02734203.9 on Jul. 22, 2013, 5 pages.
Tam et al., "3D-TV Content Generation: 2D-To-3D Conversion", ICME 2006, p. 1868-1872.
Harman et al. "Rapid 2D to 3D Conversion", The Reporter, vol. 17, No. 1, Feb. 2002, 12 pages.
Legend Films, "System and Method for Conversion of Sequences of Two-Dimensional Medical Images to Three-Dimensional Images" Sep. 12, 2013, 7 pages.
International Search Report Issued for PCT/US2013/072208, dated Feb. 27, 2014, 6 pages.
International Search Report and Written Opinion issued for PCT/US2013/072447, dated Mar. 13, 2014, 6 pages.
International Preliminary Report on Patentability received in PCT/US2013/072208 on Jun. 11, 2015, 5 pages.
International Preliminary Report on Patentability received in PCT/US2013/072447 on Jun. 11, 2015, 12 pages.
McKenna "Interactive Viewpoint Control and Three-Dimensional Operations", Computer Graphics and Animation Group, The Media Laboratory, pp. 53-56, 1992.
European Search Report Received in PCTUS2011067024 on Nov. 28, 2014, 6 pages.
Zhang, et al., "Stereoscopic Image Generation Based on Depth Images for 3D TV", IEEE Transactions on Broadcasting, vol. 51, No. 2, pp. 191-199, Jun. 2005.
Baraldi, et al., "Motion and Depth from Optical Flow", Lab. Di Bioingegneria, Facolta' di Medicina, Universit' di Modena, Modena, Italy; pp. 205-208, 1989.
Hendriks, et al. "Converting 2D to 3D: A Survey", Information and Communication Theory Group, Dec. 2005.
Abstract of "Learning to Produce 3D Media from a Captured 2D Video", Park et al., Eastman Kodak Research Journal of Latex Class files, vol. 6, Jan 2007, 4 pages.
Abstract of "Efficient and high speed depth-based 2D to 3D video conversion", Somaiya et al., Springer 3DR Express 10, 1007, 2013, pp. 1-9.

\* cited by examiner

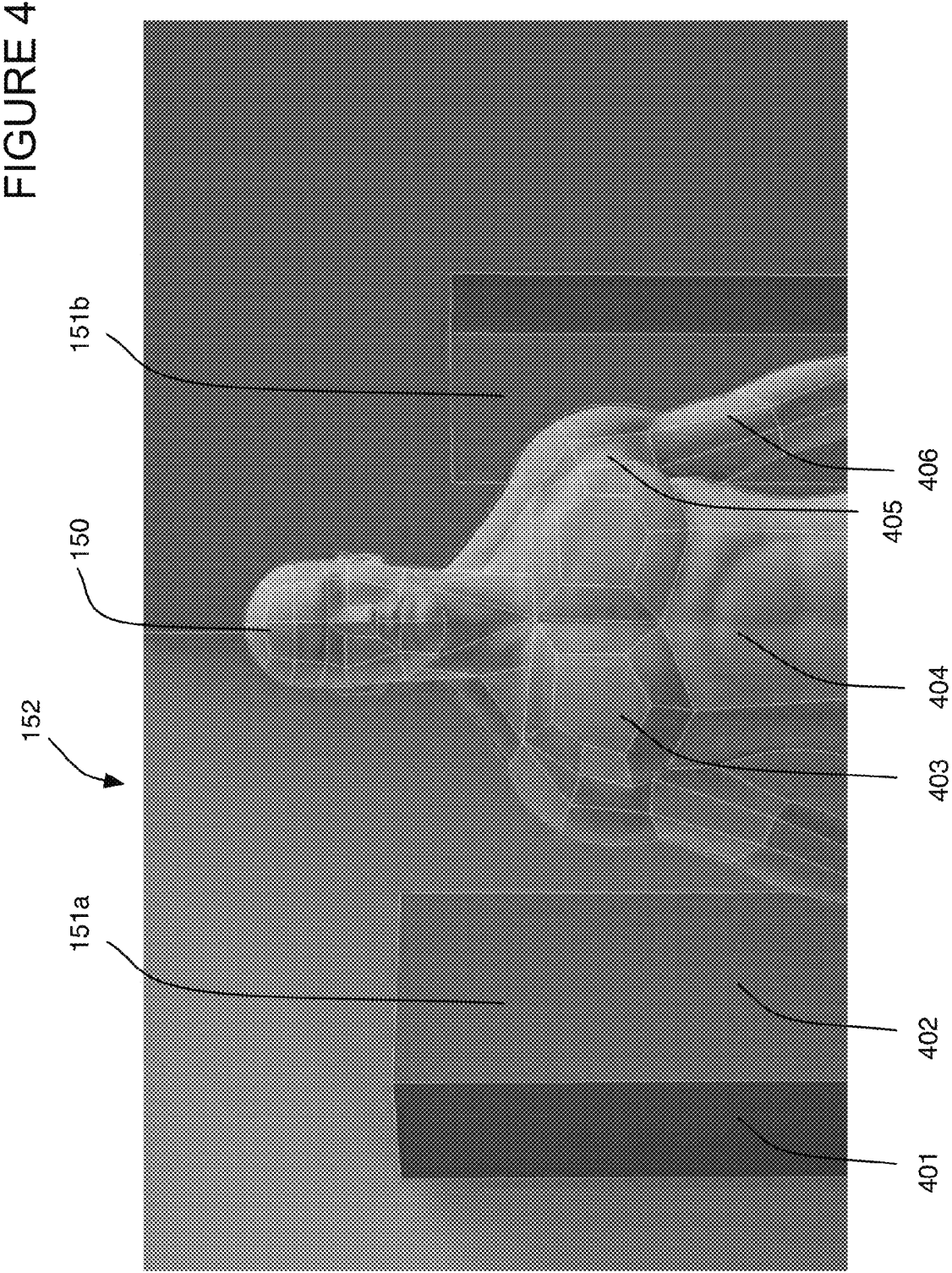

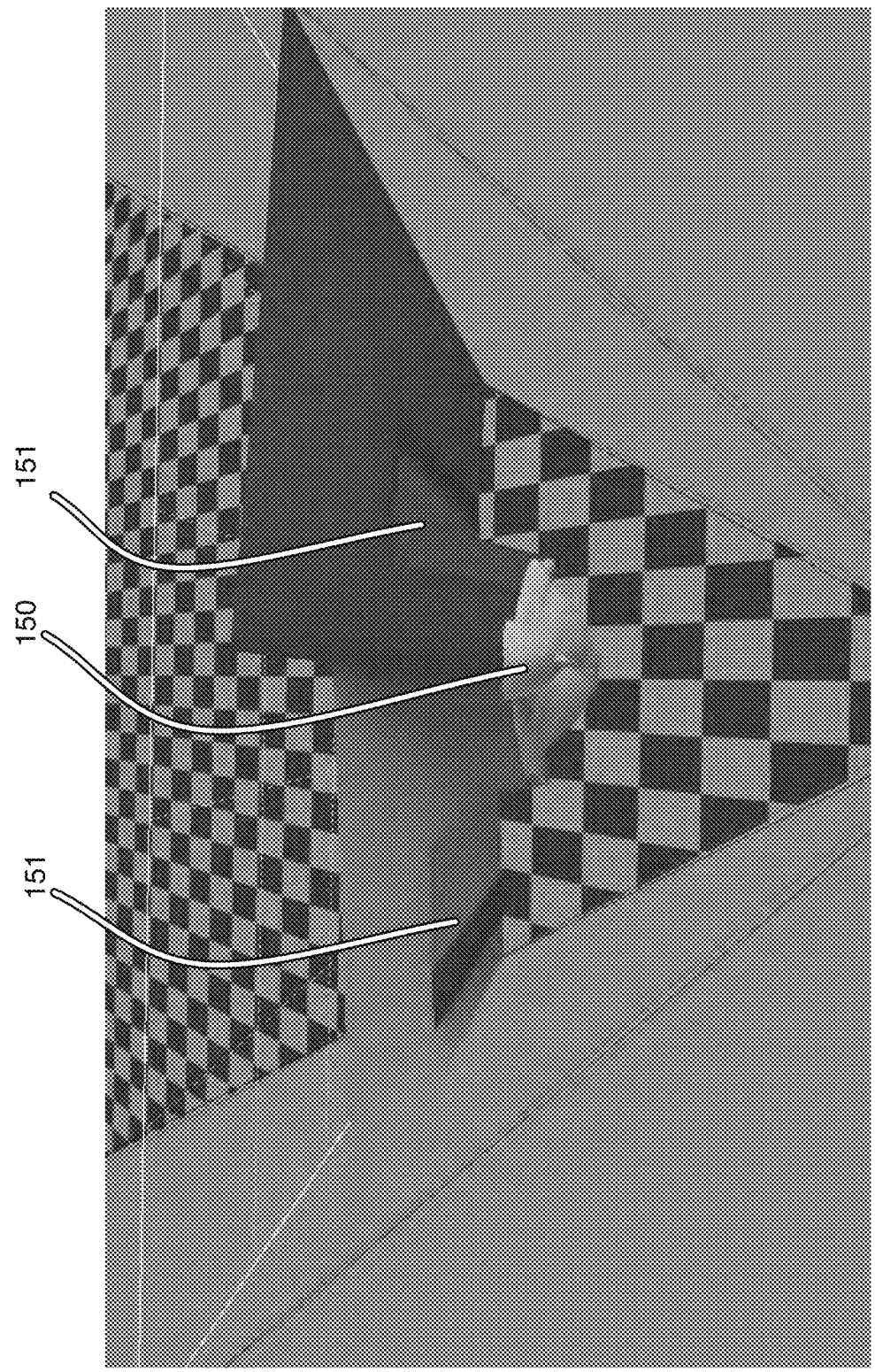

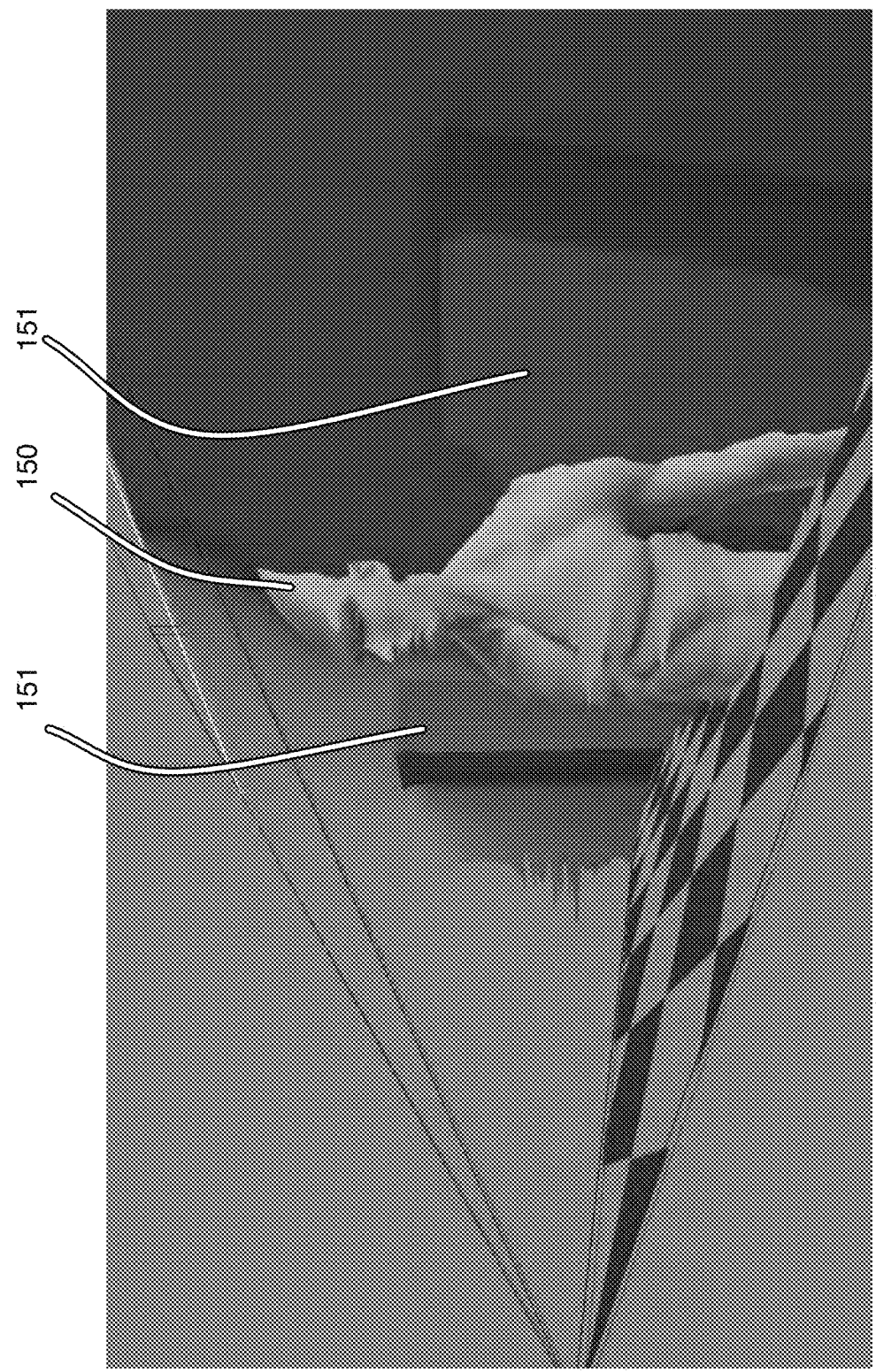

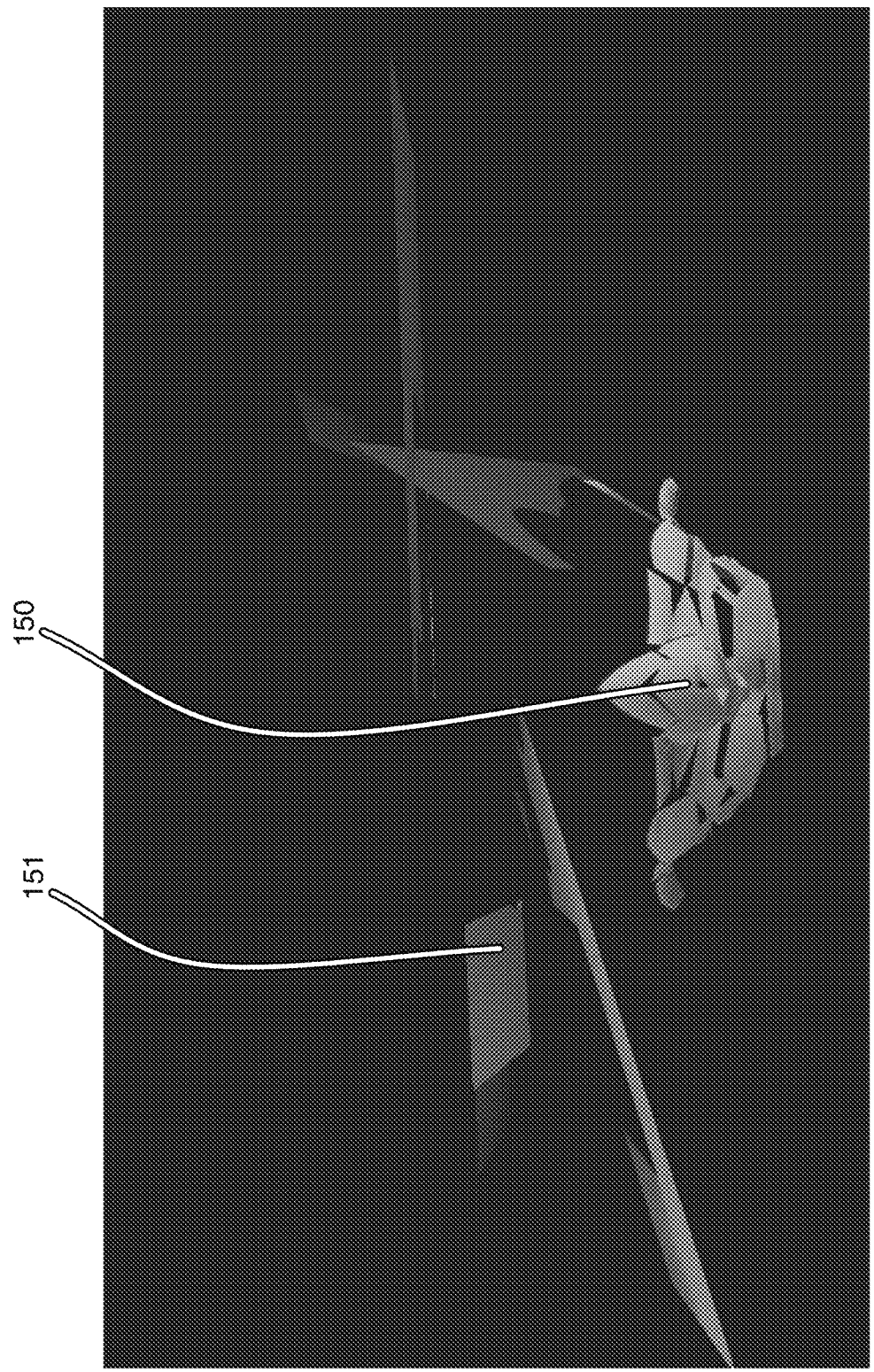

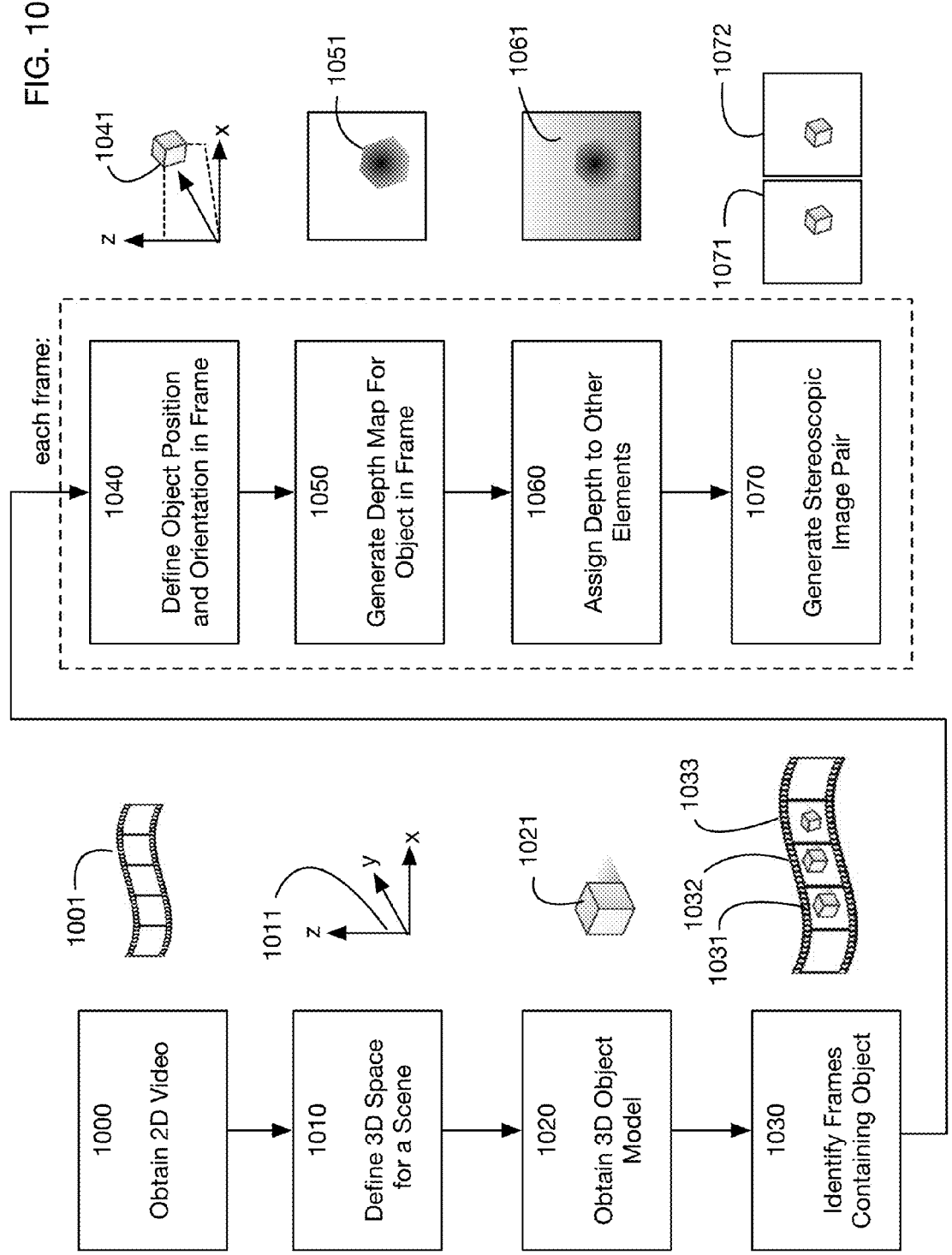

METHOD OF CONVERTING 2D VIDEO TO 3D VIDEO USING 3D OBJECT MODELS

This application is a continuation in part of U.S. Utility patent application Ser. No. 13/874,625, filed 1 May 2013, the specification of which is hereby incorporated herein by reference.

BACKGROUND OF THE INVENTION

1. Field of the Invention

One or more embodiments of the invention are related to the image processing. More particularly, but not by way of limitation, one or more embodiments of the invention enable a method of converting 2D video to 3D video using 3D object models for one or more objects in the 2D video. Embodiments of the invention obtain 3D models of objects, such as characters, and process the frames of a video to locate and orient these models in the frames. Depth maps and stereoscopic 3D video may then be generated from the 3D models. Embodiments of the invention may convert 3D scanner data to a set of rotated planes associated with masked areas of the data, thus forming a 3D object model. This enables the planes to be manipulated independently or as part of a group, and eliminates many problems associated with importing external 3D scanner data including minimization of errors that frequently exist in external 3D scanner data.

2. Description of the Related Art

Two-dimensional images contain no depth information and hence appear the same to an observer's left and right eye. Two-dimensional images include paper photographs or images displayed on a standard computer monitor. Two-dimensional images however may include shading and lighting that provide the observer a sense of depth for portions of the image, however, this is not considered a three-dimensional view of an image. Three-dimensional images on the other hand include image information that differs for each eye of the observer. Three-dimensional images may be displayed in an encoded format and projected onto a two-dimensional display. This enables three-dimensional or stereoscopic viewing for example with anaglyph glasses or polarized glasses. Other displays may provide different information based on the orientation with respect to the display, e.g., autostereoscopic displays that do not require special glasses for viewing three-dimensional images on a flat two-dimensional display. An example of such as display is a lenticular display. Alternatively, two images that are shown alternately to the left and right eyes may be viewed with shutter glasses. Regardless of the type of technology involved, conversion of two-dimensional images to stereoscopic images requires the addition of depth information to the two-dimensional input image.

Current solutions for conversion of two-dimensional images to stereoscopic images fall into two broad categories. The first category involves systems that convert two-dimensional images into three-dimensional images wherein the two-dimensional images have no associated depth maps or other depth information. Systems in this category may be automated to provide depth information based on colors or areas of the picture, but these systems have had limited success. Other systems in this category require large amounts of manual labor for highly accurate results. These manual masking systems generally operate by accepting manually created masks in order to define areas or regions in the image that have different depths and which generally represent different human observable objects. Depth information is then accepted by the system as input from artists for example, which results in nearer objects being shifted relatively further horizontally to produce left and right eye viewpoints or images, or Red/Blue anaglyph single image encodings, either of which may be utilized for stereoscopic viewing. By shifting objects in the foreground, hidden or background information may be exposed. If the missing image data is not shown in any other images in a scene, then the "gap" must be filled with some type of image data to cover the artifact. If the hidden image data does not exist in any other image in a scene, then this prohibits borrowing of pixels from the areas in other images that do contain the missing information. Various algorithms exist for filling gaps, which are also known as occlusion filling algorithms, to minimize the missing information with varying success. Generally, the depth artist gains visual clues from the image and applies depth to masks using artistic input.

The main problems with this first category of conversion are time of conversion based on the large amount of manual labor and the expense of the conversion process.

The second category involves systems that convert two-dimensional images that have associated depth maps or other depth information, into three-dimensional images. The depth information may be obtained by the system from an external "time of flight" system, where light from a laser for example is sent towards the subject and timed to determine the distance after the light reflects back from the subject. The depth information may also be obtained by the system from a "triangulation" system, which determines the angles to a subject, for example from two sensors that are a known distance away from one another. Another apparatus that may obtain depth is a light-field or plenoptic camera having multiple lenses. A recent development has been the three camera system that includes a high resolution camera and two lower resolution side cameras or "witness cameras" mounted next to the high resolution camera. A depth map may be calculated from the disparity between the two side camera images and applied to the image obtained from the high-resolution camera to generate stereoscopic images. Any missing information may be filled with image data from the side cameras to minimize artifacts such as missing or hidden information, even if not at the same resolution. Another advantage of the trifocal system is the elimination of heavy and expensive stereo camera systems that have two large and optically identical and perfectly aligned lenses.

However, there are many problems that occur when using an externally generated depth map to a Z-depth. This includes any depth map created from a disparity map that is generated from a stereoscopic pair of images, for example captured with a two-lens stereo-camera or with the witness cameras of the trifocal system. One of the main problems is that depth maps provided by external systems are noisy, may include inaccurate edges, spikes and spurious values, all of which are common with Z-depths generated from external systems. Another problem is that since the depth maps correspond either on a pixel-by-pixel basis or at least generally fairly high resolution with the associated two-dimensional image, manipulating depth on this fine granularity is extremely difficult and time consuming. These types of systems are generally directed at automatically converting video or movies for stereoscopic viewing for example without masking objects and with the labor associated therewith. Artifacts on edges of objects are common in some systems limiting their overall automation capabilities.

In addition, in many cases it is impractical to obtain externally generated depth information for every frame in a 2D video. Technologies to generate 3D information, such as 3D scanners, are expensive and time-consuming to use. It may be practical in some cases to obtain 3D information for selected objects, such as characters. However, this 3D information is static rather than integrated into each frame of a 2D video. There are no known systems that take static 3D models of objects and propagate them across multiple frames of a 2D video to generate a 3D video. This propagation may also in some cases need to take into account degrees of freedom in an object where parts of the object move relative to one another. There are no known systems that generate rigged 3D models from external depth information, and propagate these models across all frames of a 2D video scene.

For at least the limitations described above there is a need for a method to convert 2D video to 3D video using 3D object models.

BRIEF SUMMARY OF THE INVENTION

One or more embodiments described in the specification are related to method of converting of 2D video to 3D video using 3D object models that provides increased artistic and technical flexibility and rapid conversion of movies for stereoscopic viewing. Embodiments of the invention convert a large set of highly granular depth information inherent in a depth map associated with a two-dimensional image to a smaller set of rotated planes associated with masked areas in the image. This enables the planes to be manipulated independently or as part of a group and eliminates many problems associated with importing external depth maps including minimization of errors that frequently exist in external depth maps Embodiments of the invention may utilize any type of depth map including Z-Depth associated with images that are generated through rendering from a Computer Generated Imagery or CGI application such as MAYA® or HOUDINI®, depth maps obtained after conversion of a disparity map from a stereoscopic pair of images to a Z-Depth, Z-Depth extraction from of a light-field image, time-of-flight imaging systems, LIDAR, or any other type of depth map associated with a two-dimensional image.

Embodiments of the invention include a number of inherent advantages over simply using the Z-Depths as is currently performed in automated or semi-automated 2D to 3D conversion processes.

For example, embodiments of the invention transform the large set of depth map depths or Z-Depth into a manageable number of parts. Thus, the system enables an artist to manipulate individual or groups of parts for artistic purposes, as opposed to pixel-by-pixel editing. So, for example, an artist may independently adjust the angle, and hence depth of a robot's arm so the resulting stereoscopic image appears to reach out of the screen.

In addition, by transforming the Z-Depth into a manageable number of parts, the system enables an artist to group these parts and apply separate RGB image layers to these groups. This enables more efficient occlusion filling in the 2D to 3D conversion workflow.

Furthermore, embodiments of the invention mold depth data to eliminate depth errors by transforming large numbers of depth values to smaller number of plane rotations. In one embodiment, the system may calculate the normal and position for a specific region, for example to form an average, rotation value associated with a plane that represents a large group of depth values, some of which may be erroneous. Hence, issues associated with imperfect depth map data are often averaged out, or otherwise eliminated. In some extreme cases of noisy depth data, these issues may not be fully resolved, however, embodiments of the invention reduce the problem to a manageable number of editable parts, and enable the issues to be rapidly and easily corrected automatically or by accepting inputs from an artist. One or more embodiments of the invention may utilize a normal vector algorithm. Other algorithms may be utilized alone or in combination with the normal vector method to achieve similar or advantageous results. For example, embodiments of the invention may treat each pixel as a point in space, e.g., wherein X and Y represent the position of the pixel and Z represents the Z-Depth value of that pixel, and isolate only the points within the defined region, and calculate the "best-fit" plane for that group of points, and/or a normal vector representation of the plane. The normal vector in this embodiment is orthogonal to the plane and may be encoded into separate RGB channels in order to provide a viewable representation of the planar angles with respect to the optical display. Embodiments of the invention may utilize any type of plane fitting algorithm including, but not limited to, regression plane, orthogonal distance regression plane, etc. Embodiments of the invention may utilize any type of filtering as part of the transformation processing including but not limited to dilation and erosion.

One or more embodiments of the invention implement a method on a computer for example wherein the method includes obtaining an external depth map associated with a two-dimensional image, obtaining at least one mask associated with at least one area within the two-dimensional image, calculating a fit or best fit for a plane using a computer based on depth associated with the at least one area associated with each of the at least one mask, applying depth associated with the plane having the fit to the at least one area to shift pixels in the two-dimensional image horizontally to produce a stereoscopic image or stereoscopic image pair.

Embodiments of the method may also include obtaining of the external depth map associated with a two-dimensional image by obtaining a disparity map, or a depth map of lower resolution than the two-dimensional image from a pair of witness cameras, or a depth map from time-of-flight system, or a depth map from a triangulation system.

Embodiments of the invention may also include obtaining at least one mask associated with at least one area within the two-dimensional image by automatically generating the at least one mask comprising the at least one area wherein the at least one area is over a predefined size and within a predefined depth range, or automatically generating the at least one mask comprising the at least one area wherein the at least one area comprises a boundary having a difference in luminance values over a predefined threshold, or both methods of size, depth range and boundary or any combination thereof.

Embodiments of the invention may also include calculating the best fit for a plane using a computer based on depth associated with the at least one area associated with each of the at least one mask by calculating a normal vector for the plane, or a regression fit for the plane, or an orthogonal distance regression fit for the plane, or in any other known manner regarding fitting a plane to particulars points in three-dimensional space.

Embodiments of the invention generally also include applying depth associated with the plane having the best fit to the at least one area to shift pixels in the two-dimensional image horizontally to produce a stereoscopic image or stereoscopic image pair.

Embodiments may also include grouping two or more of the planes in order to provide a piecewise masked surface area. The grouping may include a link of a predefined minimum and maximum distance, which enables moving one plane to move other grouped planes if the maximum values are hit. The minimum values may be zero or negative to allow to precise joining of planes or slight overlap for example. In one or more embodiments, the grouping may include a link having a spring constant, this enables the movement of planes relative to one another to self align with respect to the other planes to minimize the overall spring force on three or more of the corner points of the plane. Alternatively or in combination, embodiments of the invention may include altering automatically any combination of position, orientation, shape, depth or curve of said plane in order to fit edges or corners of the plane with another plane. This enables a plane to be positioned in three-dimensional space, rotated in three-dimensions, reshaped by moving a corner point, warped in effect by adding depth or a curve to the plane, for example to add depth to the plane itself to match the underlying image data. Embodiments of the invention may also include accepting an input to alter any combination of position, orientation, shape, depth or curve of the plane, for example to artistically fit the underlying image data, correct errors or artifacts from the automated fitting process for touch up, etc.

One or more embodiments of the invention use one or more 3D object models to convert all or portions of a 2D video to a 3D video. A 3D object model may be obtained from any source and in any format for any object or objects that appear in one or more frames of a 2D video. For a scene of the 2D video containing the object, a 3D space may be defined for example with coordinate axes for the location of the scene. A 3D object model may then be positioned and oriented in this 3D space for each frame in which the corresponding object appears. From this positioned and oriented 3D object model, a depth map for the object in the frame may be generated. Embodiments may augment the depth map with depth information for other elements in the frame. A stereoscopic image pair may then be generated from the depth map and from the 2D frame using techniques known in the art for 2D to 3D conversion.

One or more embodiments may obtain 3D scanner data for an object, and convert this scanner data into a 3D model for the object. 3D data may be obtained using any 3D scanning technology, including for example laser systems using time-of-flight or triangulation, or systems using structured light fields. 3D data may be obtained from stereo cameras or systems with witness cameras. Any technique for obtaining 3D data describing an object is in keeping with the spirit of the invention.

Conversion of 3D data to a 3D object model may for example include retopologizing the 3D data to a lower polygon count model or to a model with parameterized surfaces. One or more embodiments may use retopologizing techniques to reduce model complexity. Conversion may for example include fitting one or more planes to the 3D data and generating a 3D object model from these planes. Any of the techniques described above for fitting and adjusting planes or other surfaces may be used in one or more embodiments to generate a 3D object model. For example, one or more planes may be defined using regression fit, orthogonal distance regression fit, or calculation of normal vectors to the planes. One or more embodiments may combine multiple planes into groups of planes with links between the planes; links may for example define constraints between the edges or corners of the planes. One or more embodiments may employ link constraints that define maximum or minimum values for distances or angles. One or more embodiments may employ link constraints that use spring constants for the links and that for example minimize a potential energy of the model using the spring constants. One or more embodiments may define masks for selected areas of the model, using for example areas of predefined size or predefined depth, or areas with boundaries determined by changes in luminance or other image features over predefined thresholds.

One or more embodiments may adjust the planes or surfaces fit to 3D data, for example by altering one or more of position, orientation, shape, depth or curve of the more planes in order to fit edges or corners of said the planes with one another. Adjustments may be made manually or may be made automatically using a computer. The adjusted planes or surfaces may be used to generate a 3D object model.

One or more embodiments may locate and orient a 3D model in a frame using one or more model features. Features on the 3D object model may be aligned with pixel locations in the frame, and the 3D object model position and orientation in the 3D space of the scene may be calculated using techniques known in the art to minimize errors between observed pixel coordinates and the projection of the 3D feature points onto the image plane. One or more embodiments may align 3D object models with images in a frame in one or more key frames, and automatically determine the alignment in non-key frames using automated feature tracking In one or more embodiments one or more objects may be non-rigid in that they comprise multiple parts that may move relative to one another. One or more embodiments may generate or obtain rigged 3D object models with degrees of freedom between the parts of the models. Locating and orienting these rigged models in frames may include determining values for the degrees of freedom of the rigged models. These values may be determined manually, automatically, or using a combination of manual and automated techniques. One or more embodiments may determine the location and orientation of each part of a rigged 3D object model by aligning features of the parts with pixels in an image of the object in a frame. Values for degrees of freedom may be interpolated automatically between key frames. One or more embodiments may manually locate and orient an object and define values for degrees of freedom in key frames, and may use feature tracking to automatically determine the object location and orientation and the values of the degrees of freedom in non-key frames.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 4 illustrates an example set of masks applied to areas or regions of the two-dimensional input image.

FIGS. 7A-C illustrates a perspective, side and top view of perfect error-free depth applied to the two-dimensional input image. FIGS. 7D-F illustrates a perspective, side and top view of imperfect typical depth having errors and acquired from an external depth capture apparatus or system and applied to the two-dimensional input image.

FIGS. 8D-F illustrates a perspective, side and top view of imperfect typical depth acquired from an external depth capture apparatus or system and applied to planes and/or masks of areas or regions associated with to the two-dimensional input image.

FIG. 10 illustrates a flowchart of an embodiment of a method to convert 2D video to 3D video using an object model that defines the three-dimensional shape of an object that appears in one or more scenes of the 2D video.

DETAILED DESCRIPTION OF THE INVENTION

An method for converting 2D video to 3D video using 3D object models will now be described. In the following exemplary description numerous specific details are set forth in order to provide a more thorough understanding of embodiments of the invention. It will be apparent, however, to an artisan of ordinary skill that embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
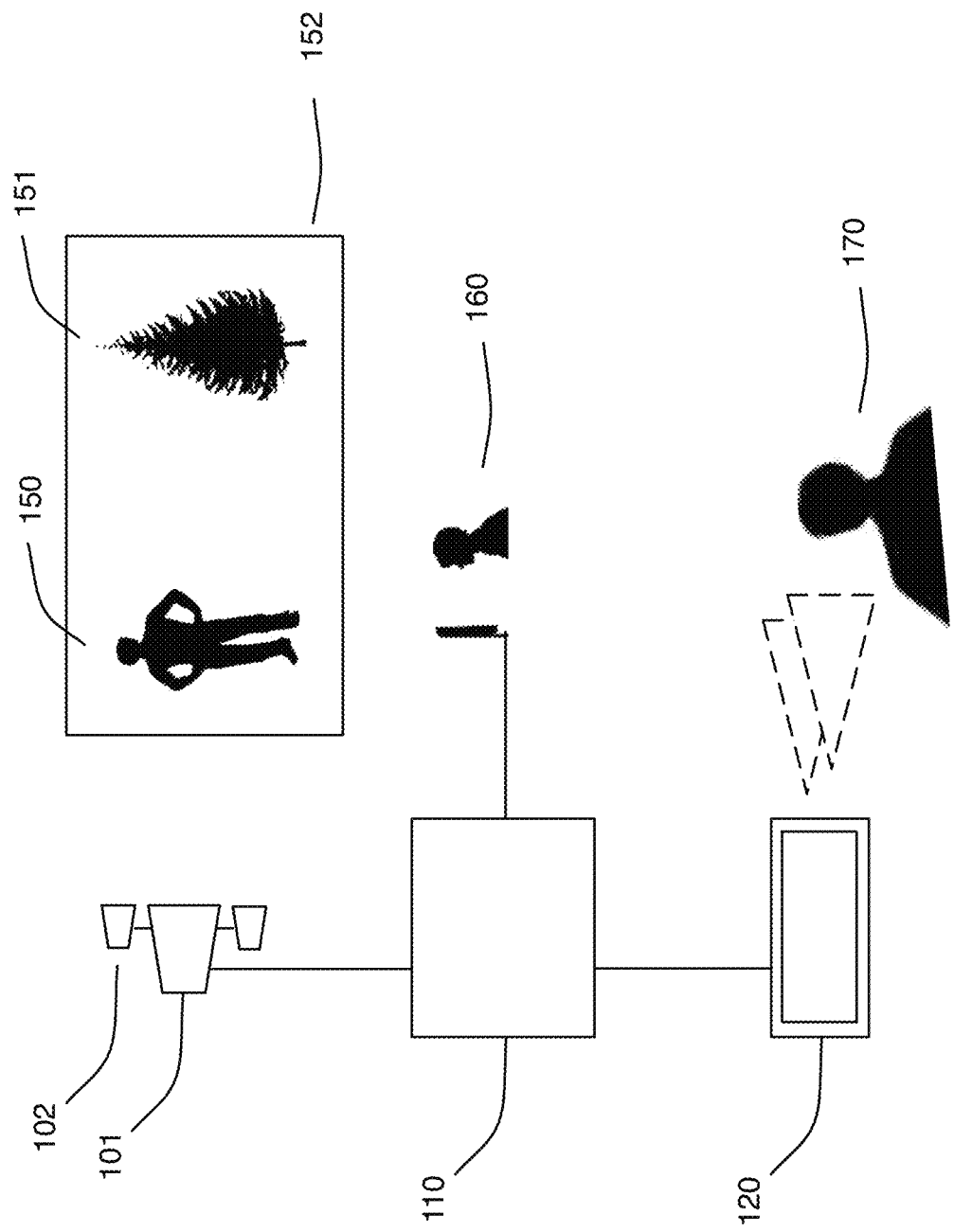
FIG. 1 illustrates an exemplary overall system architecture for one or more embodiments of the invention.

FIG. 1 illustrates an exemplary overall system architecture for one or more embodiments of the invention. As shown, camera 101 and associated external depth capture apparatus 102, e.g., a single apparatus such as a light-field or time-of-flight apparatus, or as shown with two side mounted witness cameras for example, are utilized to capture images and depth values associated with foreground object 150, background object 151 in scene 152. Generally, multiple images are captured at fixed points in time to obtain a movie. Other embodiments may utilize depth captured from or input via other systems not directly coupled with camera 101, including computer generated depths associated with computer-animated characters or objects, external LIDAR, plenoptic camera or any other external depth capture apparatus for example. Embodiments of the system generally include a computer such as server 110 that enables artist(s) 160 to apply and/or correct depth for example as obtained from the external depth capture apparatus 102 or any other external source of depth. Embodiments of the server are generally utilized to obtain masks associated with areas within the foreground object 150, background object 151 or elsewhere in the scene 152. The masks may be automatically generated or accepted by the server for example by artist 160. The server may automatically calculate a fit for planes or masks associated with areas of the images or accept inputs to alter the fit from artist 160 for example. The system may optionally also automatically alter the position, orientation, shape, depth or curve of planes or masks to fit the edges of the planes or masks with other planes or masks for example. Embodiments apply the depth of the planes or masks to the areas in the image to produce a stereoscopic image, e.g., anaglyph, or stereoscopic image pair for display on visual output 120 by viewer 170.

Figure 2:
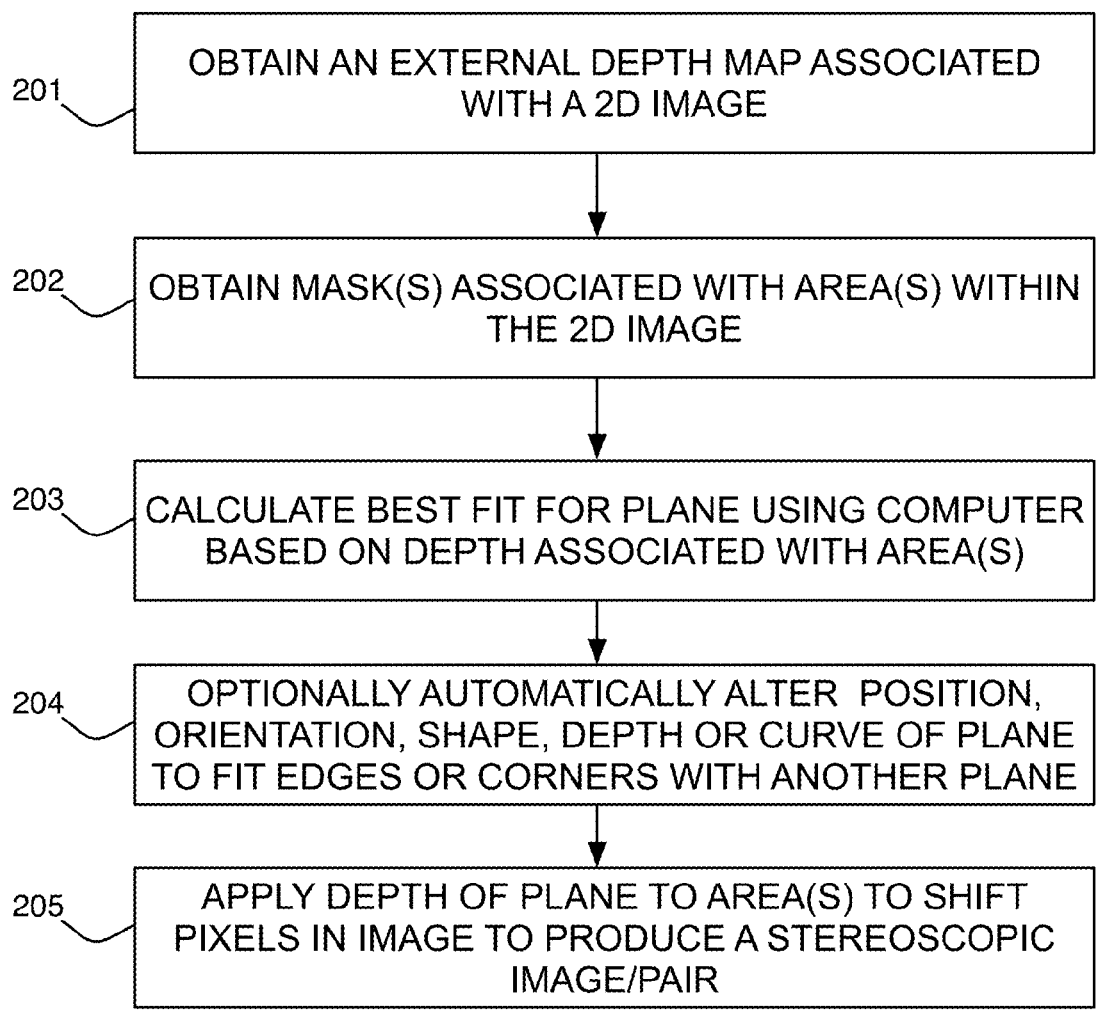
FIG. 2 illustrates a flow chart for an embodiment of the method of the invention.

FIG. 2 illustrates a flow chart for an embodiment of the method of the invention wherein the method includes obtaining an external depth map associated with a two-dimensional image at 201, obtaining at least one mask associated with at least one area within the two-dimensional image at 202, calculating a fit or best fit for a plane using a computer based on depth associated with the at least one area associated with each of the at least one mask at 203, optionally, embodiments of the method may also automatically alter the position, orientation, shape, depth or curve of planes or masks to fit the edges of the planes or masks with other planes or masks for example at 204, applying depth associated with the plane having the fit to the at least one area to shift pixels in the two-dimensional image horizontally to produce a stereoscopic image or stereoscopic image pair at 205. One or more embodiments thus enable an external depth map transformation method of converting two-dimensional images to stereoscopic images that provides increased artistic and technical flexibility and rapid conversion of movies for stereoscopic viewing. Embodiments of the invention convert a large set of highly granular depth information inherent in a depth map associated with a two-dimensional image to a smaller set of rotated planes associated with masked areas in the image. This enables the planes to be manipulated independently or as part of a group and eliminates many problems associated with importing external depth maps including minimization of errors that frequently exist in external depth maps.

Figure 3:
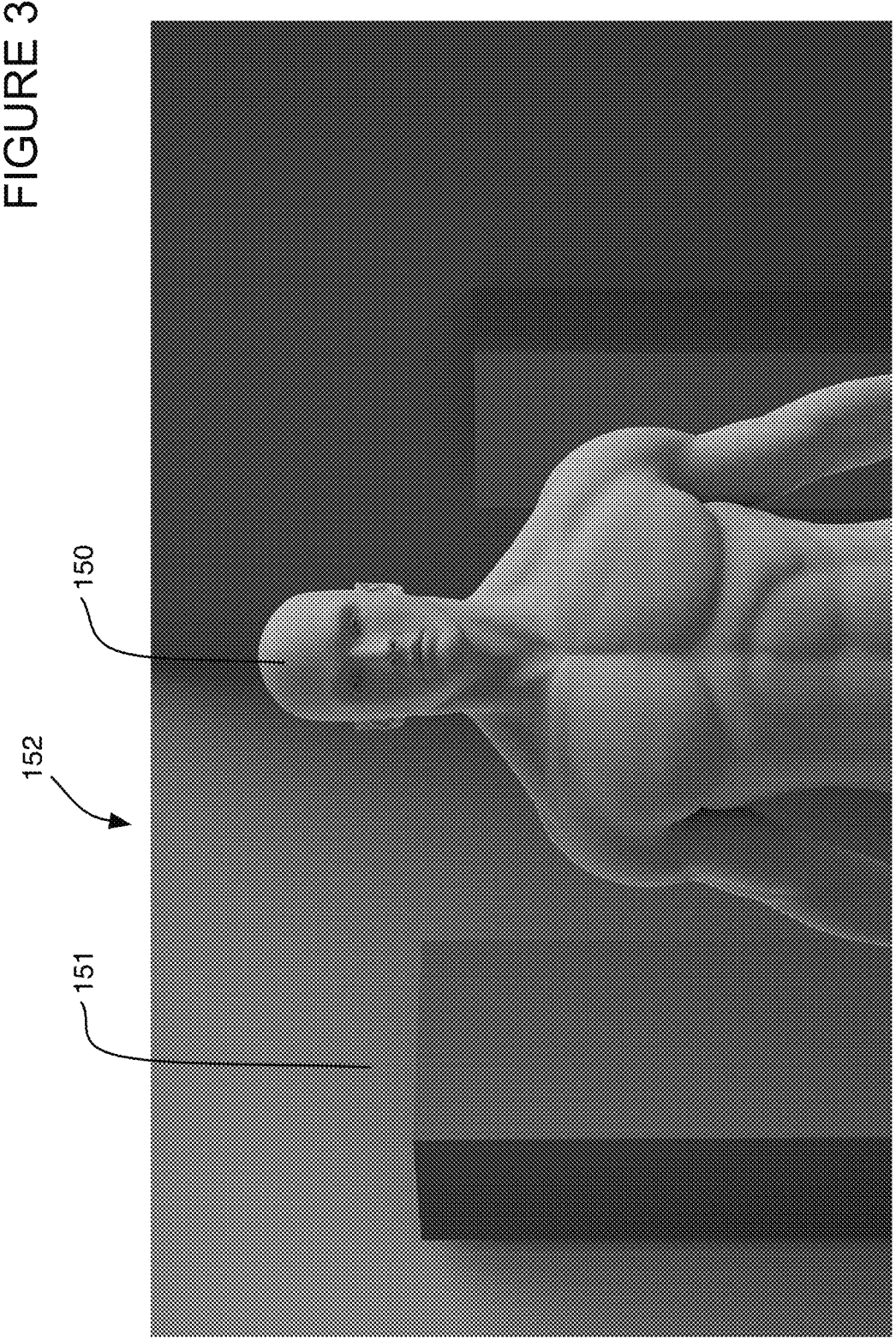
FIG. 3 illustrates an example two-dimensional input image.

FIG. 3 illustrates an example two-dimensional input image. As shown, foreground object 150, here a CGI human torso and background object 151, here a box form a scene in two-dimensional space with no depth information encoded into the image.

FIG. 4 illustrates an example set of masks applied to areas or regions of the two-dimensional input image. As shown, masks 401 and 402 are utilized to represent sides of the box 151a with flat planes, while masks 403, 404, 405, 406 are utilized to represent portions of the human torso with flat and/or curved planes, namely the front of the pectoral area, stomach area, front inner shoulder area, and front bicep area of the human torso. The other box in the background, box 151b is also shown with masks that are covered by foreground object, e.g., the human torso. Embodiments of the invention may also include obtaining at least one mask associated with at least one area within the two-dimensional image by automatically generating the at least one mask comprising the at least one area wherein the at least one area is over a predefined size and within a predefined depth range, or automatically generating the at least one mask comprising the at least one area wherein the at least one area comprises a boundary having a difference in luminance values over a predefined threshold, or both methods of size, depth range and boundary or any combination thereof. As shown masks representing flat planes 401 and 402 may be obtained by determining that they are over N pixels by M pixels and have within a K to L range in orthogonal vector value. The test regions for generating masks may be iterated through the image and enlarged to fit the underlying area if the depth data is within the K to L range for example. Masks 403-406 may be curved or faceted or flat to represent the shape of any underlying portion that is within a predefined size and/or vector range for example. Any algorithm for detecting object types and assigning predefined mask groups to represent the underlying two-dimensional image are in keeping with the spirit of the invention.

Figure 5A:
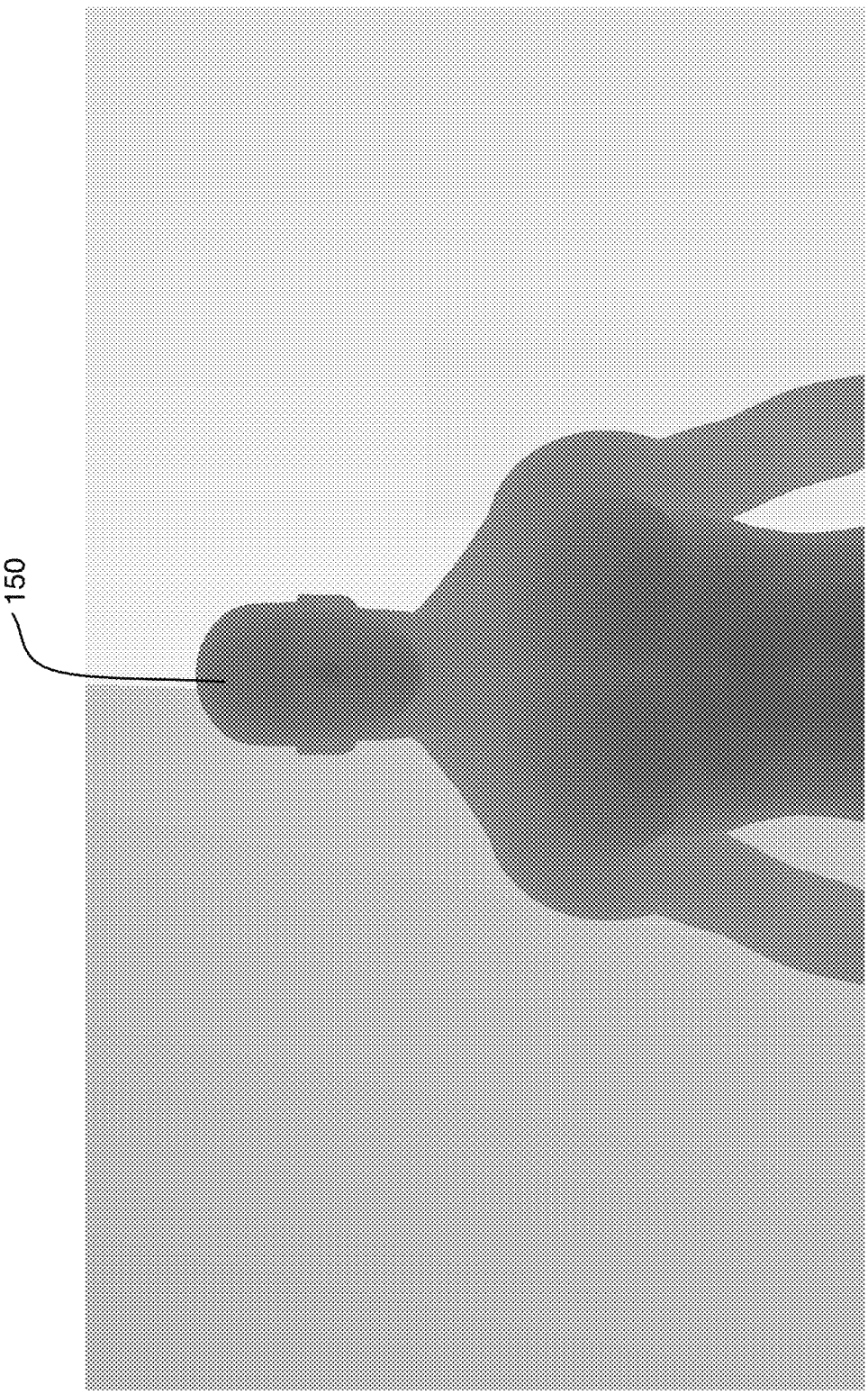
FIG. 5A illustrates a perfect error free input depth map associated with the two-dimensional image.

FIG. 5A illustrates a perfect error free input depth map associated with the two-dimensional image. As shown, darker luminance values are encoded as nearer to the observer, although the reverse encoding may be utilized. There is no requirement that the depth map has to be in a viewable format, however, this encoding may enable intuitive viewing of depth errors for example. If all depth maps were error free, then embodiments of the invention may still be utilized to alter depth associated with the two-dimensional image in a manageable manner. However, since most depth maps are not perfect, embodiments of the invention enable error minimization and manageability unknown in the art.

Figure 5B:
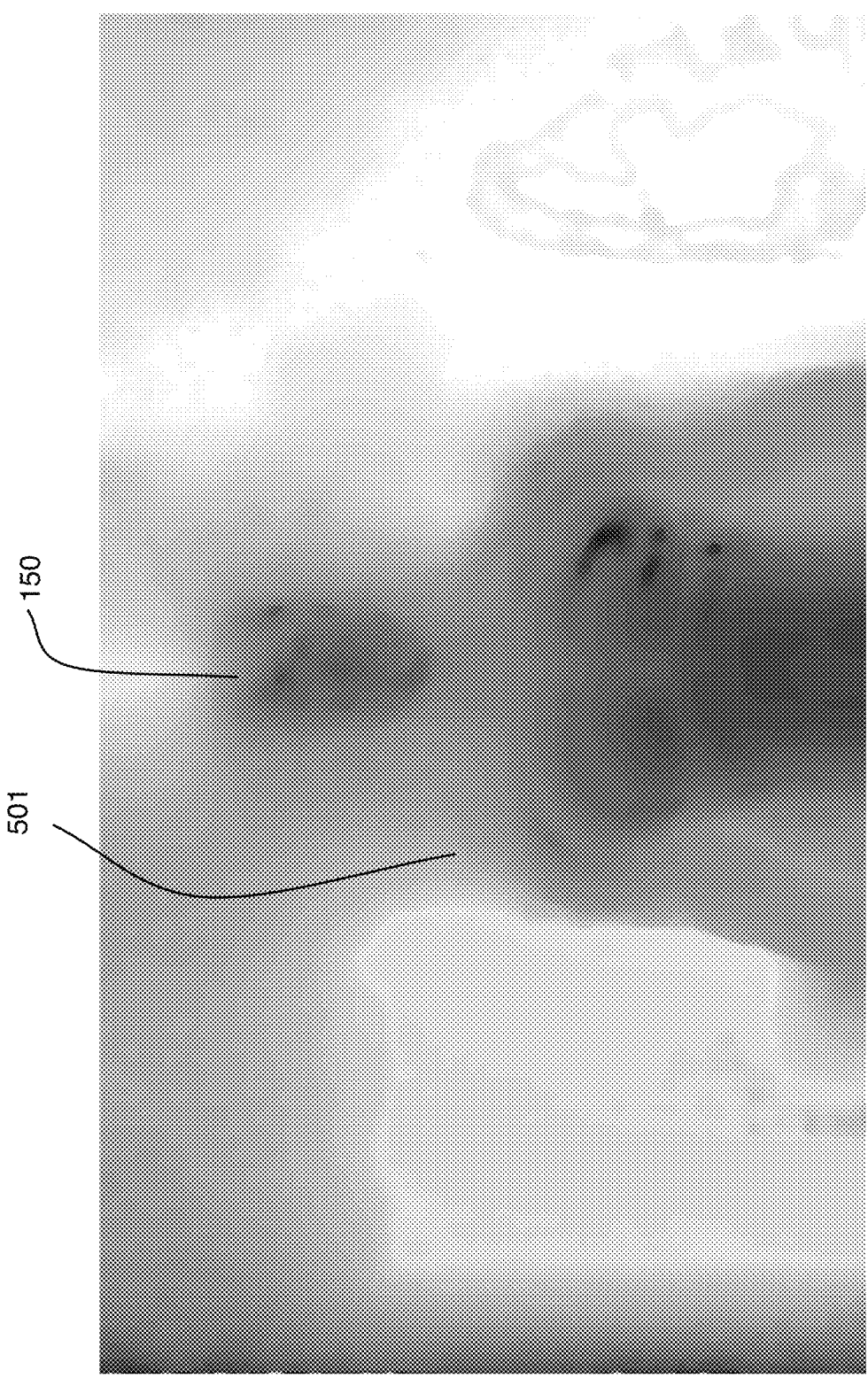
FIG. 5B illustrates a typical depth map having erroneous depth data as acquired from or calculated from an external depth capture apparatus or system.

FIG. 5B illustrates a typical depth map having erroneous depth data 501 as acquired from or calculated from an external depth capture apparatus or system. This problem makes some external depth maps nearly unusable for automated depth conversion, however, embodiments of the system enable use of error prone depth maps in a manageable manner.

Embodiments of the method may also include obtaining of the external depth map associated with a two-dimensional image by obtaining a disparity map, or a depth map of lower resolution than the two-dimensional image from a pair of witness cameras, or a depth map from time-of-flight system, or a depth map from a triangulation system. Embodiments of the invention may also include obtaining any type of depth map at 201 including Z-Depth associated with images that are generated through rendering from a Computer Generated Imagery or CGI application such as MAYA® or HOUDINI® as shown for example in FIG. 5A, depth maps obtained after conversion of a disparity map from a stereoscopic pair of images to a Z-Depth for example as shown in FIG. 5B, Z-Depth extraction from of a light-field image, time-of-flight imaging systems, LIDAR, or any other type of depth map associated with a two-dimensional image.

Embodiments of the invention include a number of inherent advantages over simply using the Z-Depths as is currently performed in automated or semi-automated 2D to 3D conversion processes.

For example, embodiments of the invention transform the large set of depth map depths or Z-Depth into a manageable number of parts. Thus, the system enables artist 160 to manipulate individual or groups of parts for artistic purposes, as opposed to pixel-by-pixel editing. So, for example, the artist may independently adjust the angle, and hence depth of a robot's arm so the resulting stereoscopic image appears to reach out of the screen. In one or more embodiments, the planes may be grouped and movement or reshaping of a plane in two or three dimensions may move or reshape other grouped or otherwise coupled planes.

In addition, by transforming the Z-Depth into a manageable number of parts, the system enables an artist to group these parts and apply separate RGB image layers to these groups. This enables more efficient occlusion filling in the 2D to 3D conversion workflow.

Figure 6A:
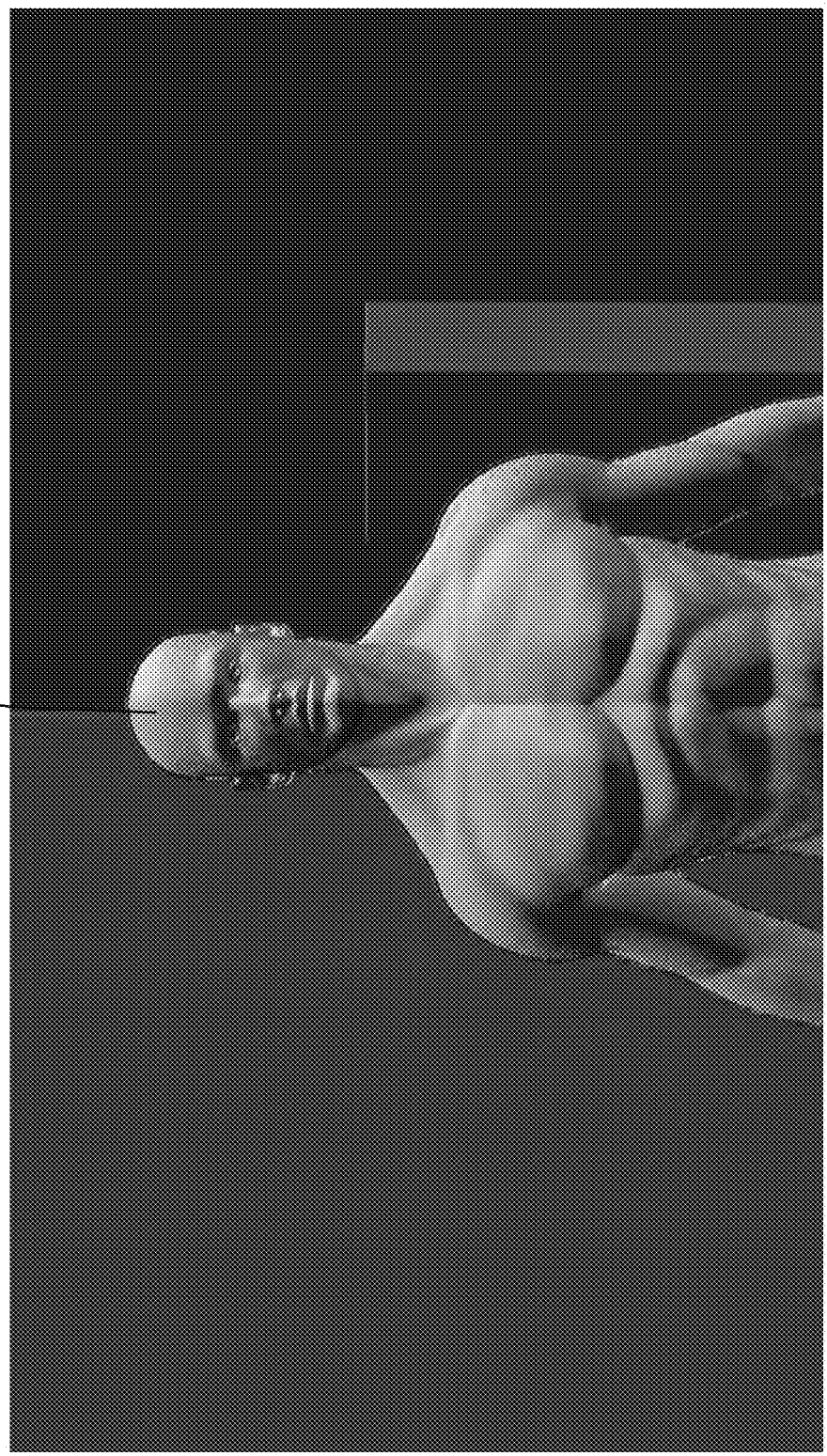
FIG. 6A illustrates a perfect normal map showing colors associated with angles of the surface of pixels within the two-dimensional image of FIG. 5A.

FIG. 6A illustrates a perfect normal map showing colors associated with angles of the surface of pixels within the two-dimensional image of FIG. 5A. For example by encoding separate RGB channels with X, Y and Z information related to the vector orthogonal to the particular area, a viewable format for normal vectors is thus obtained. If X increases from left to right, and Red is utilized as the X vector channel, then areas pointing to the right for example have a higher red value. If Y increases in the vertical direction and if Green is utilized for the Y channel, the areas having an orthogonal vector pointing have a higher green value. Any other encoding for visually viewable normal vector formats is in keeping with the spirit of the invention.

Figure 6B:
FIG. 6B illustrates an imperfect normal map associated with erroneous depth data as acquired from or calculated from an external depth capture apparatus or system as shown in FIG. 5B.

FIG. 6B illustrates an imperfect normal map associated with erroneous depth data as acquired from or calculated from an external depth capture apparatus or system as shown in FIG. 5B. This image shows the severe problems with error prone depth data showing error area 501 indicating an area that is pointing upward, when it is really not (see FIG. 6A for error free portion of image).

Figure 7A:
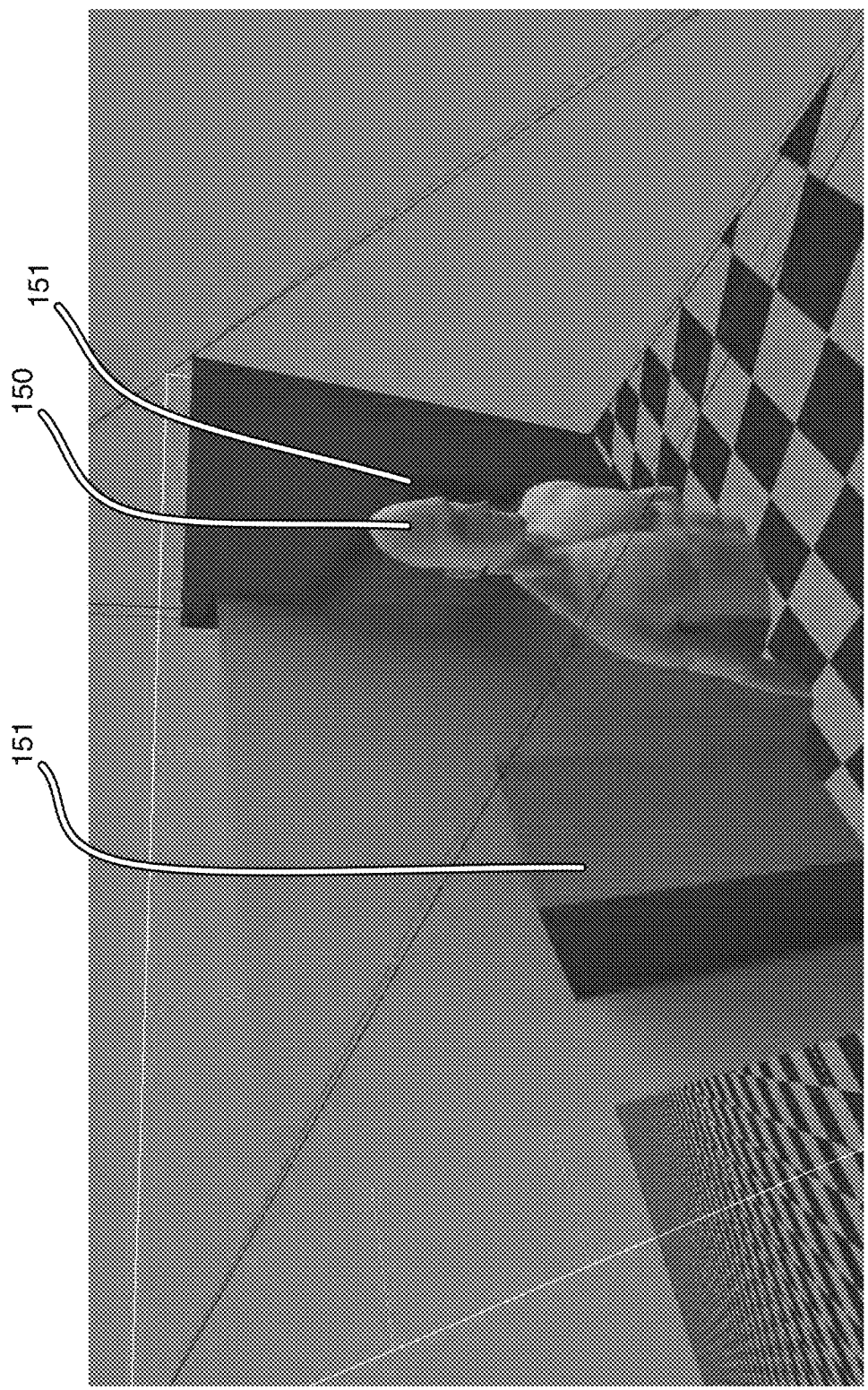
Figure 7B:
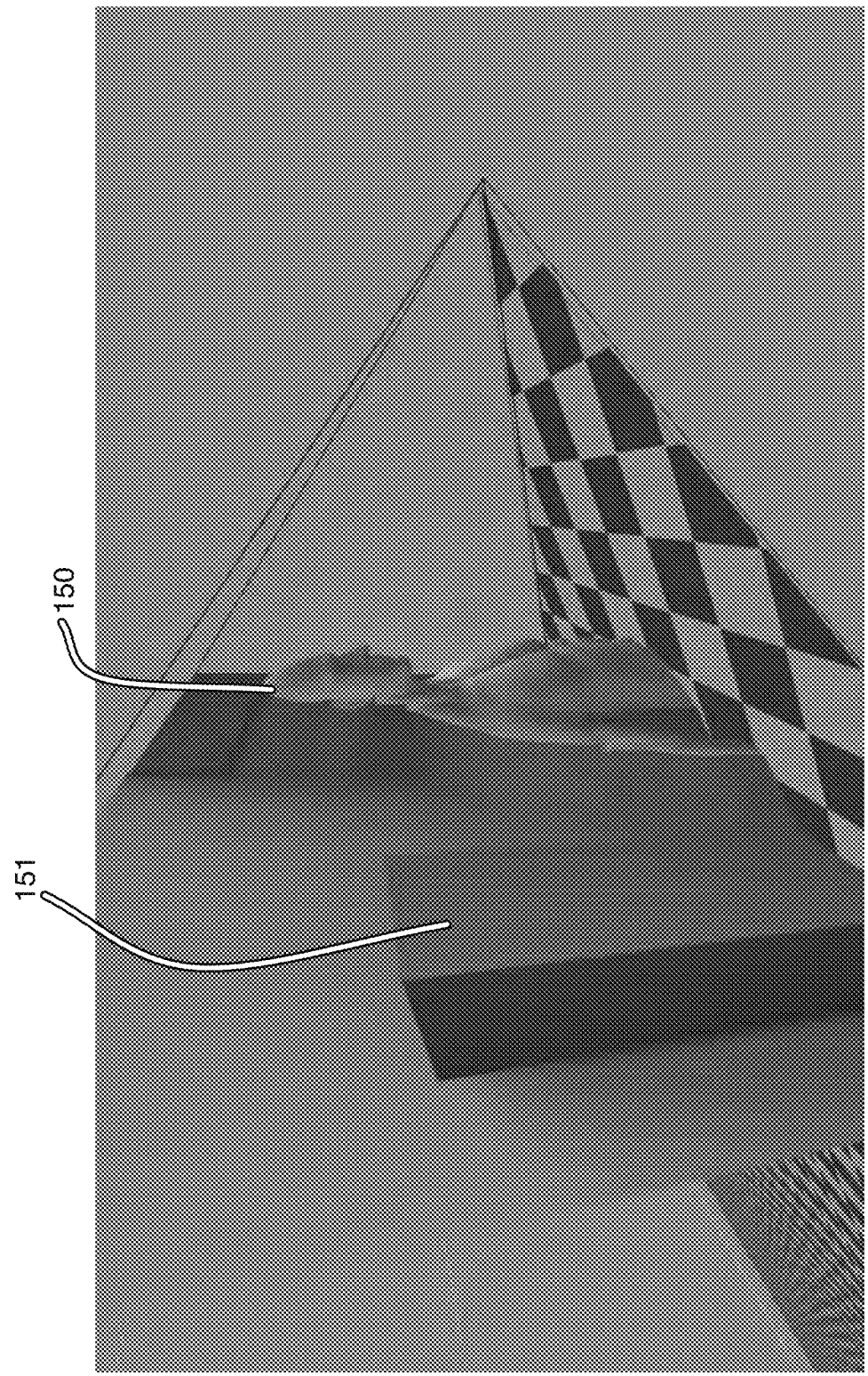

FIGS. 7A-C illustrate a perspective, side and top view of perfect error-free depth applied to the two-dimensional input image. If depth is error free, then the foreground object may be viewed with depth without errors in the foreground object, however, depending on the depth capture system, missing background data may exist and cause artifacts if there are not other images in a scene that have the missing background information. This occurs for example if the foreground object does not move with respect to the background during the scene.

Figure 7E:
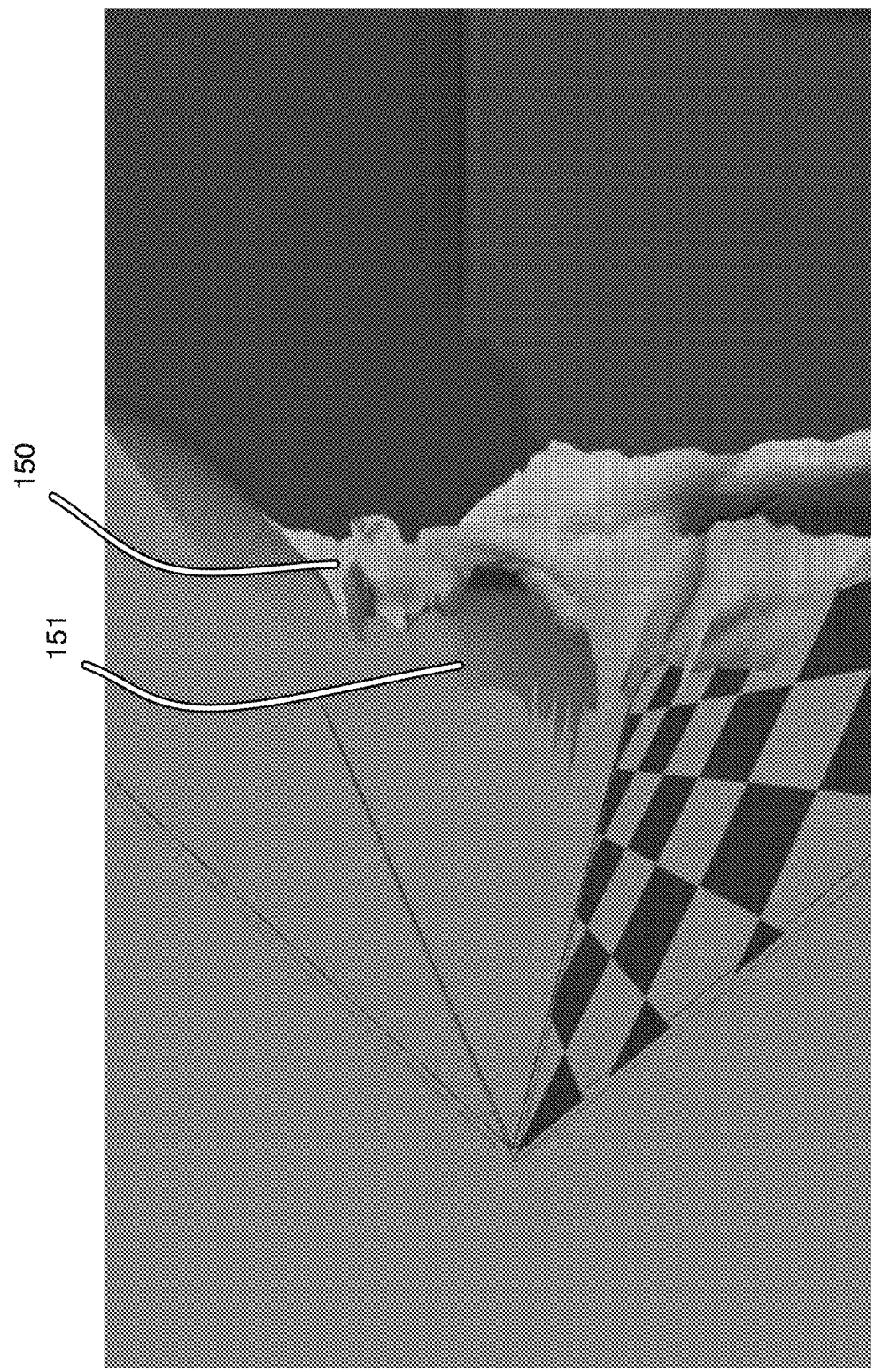
Figure 7F:
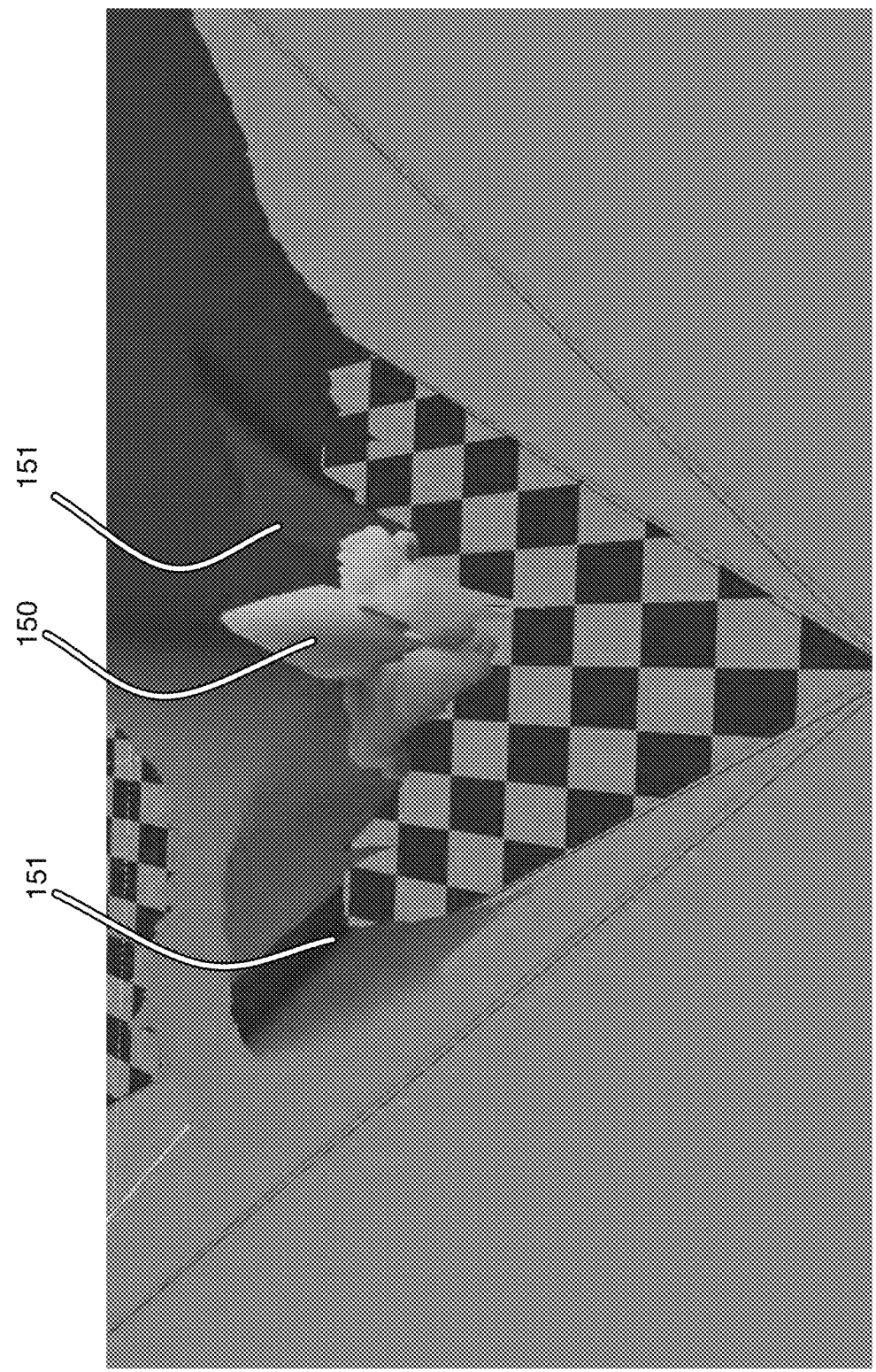

FIGS. 7D-F illustrate a perspective, side and top view of imperfect typical depth having errors and acquired from an external depth capture apparatus or system and applied to the two-dimensional input image. As shown, portions of the torso stretch outward when they should not, errors in the left box 151 are shown as well with a curved flat surface near the top. The errors in the depth shown as applied in FIGS. 7D-F are difficult to fix by an artist since the errors occur on a small granular level, for example pixel or sub-pixel and require tedious paint style operations to correct. In addition, altering a depth of a visible area such as the arm is also quite difficult and economically unfeasible since the operations occur at the pixel level and not associated with a mask or masks that represents the arm for example.

Figure 8A:
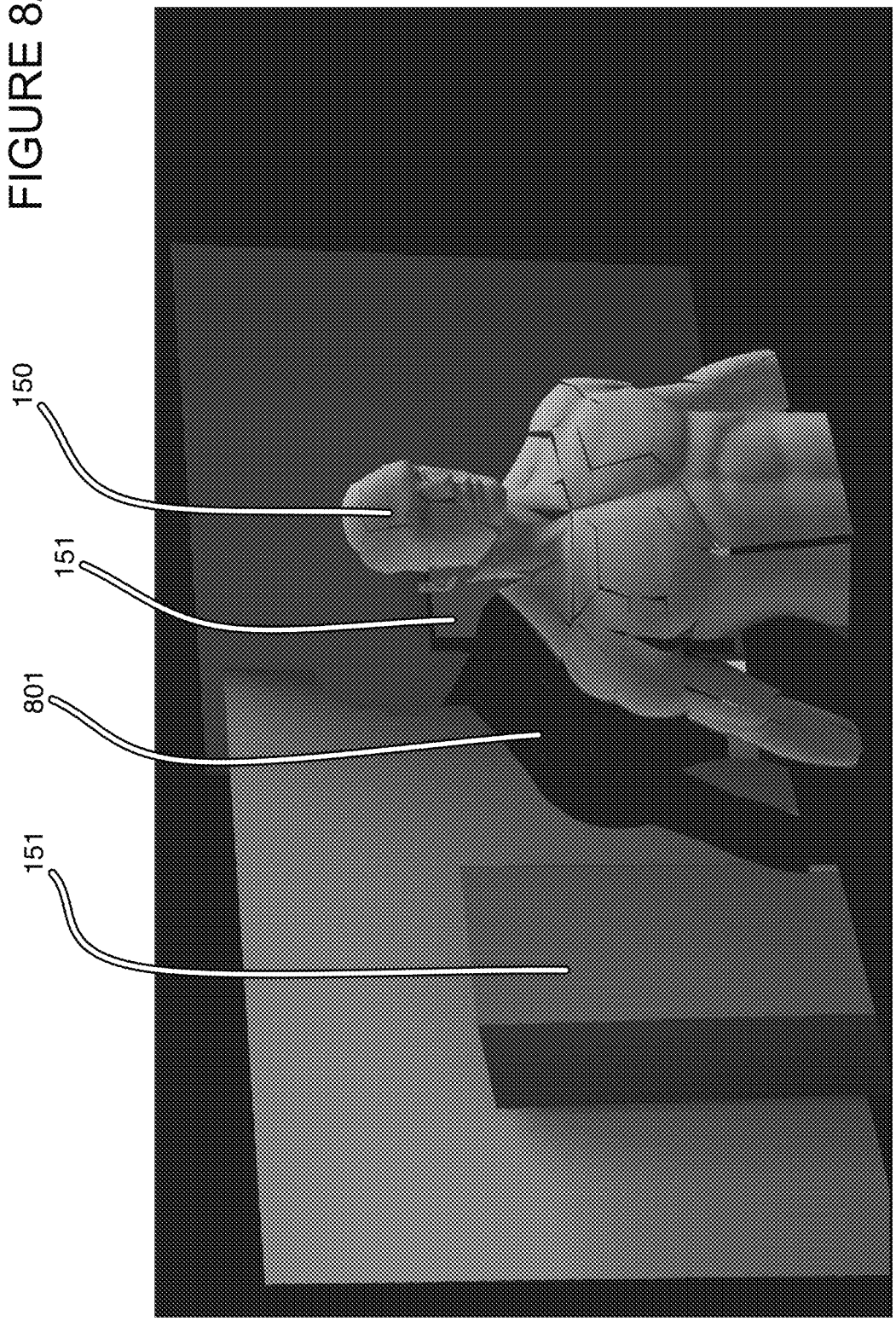
FIGS. 8A-C illustrates a perspective, side and top view of perfect error-free depth applied to planes and/or masks of areas or regions associated with the two-dimensional input image.
Figure 8B:
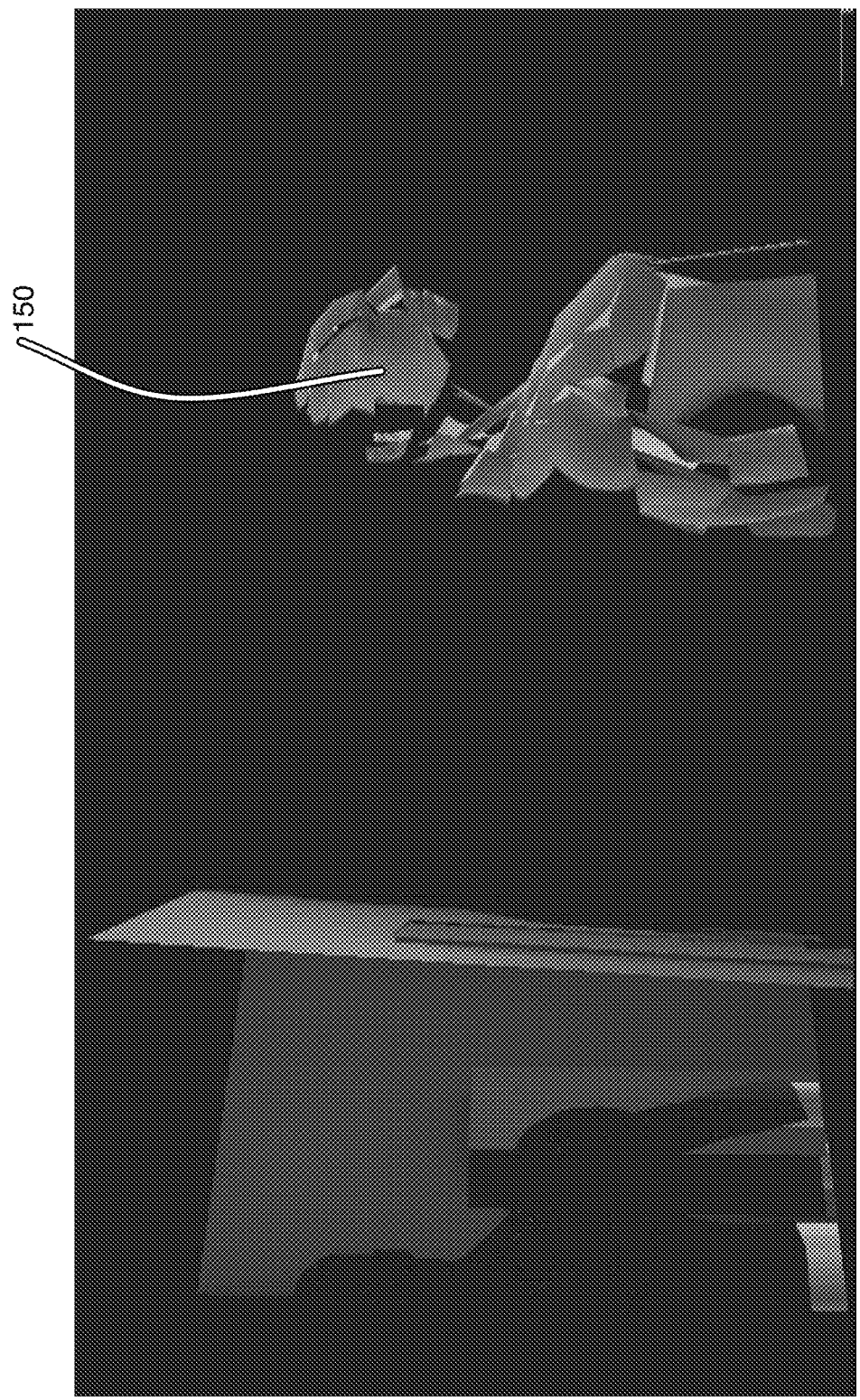
Figure 8C:
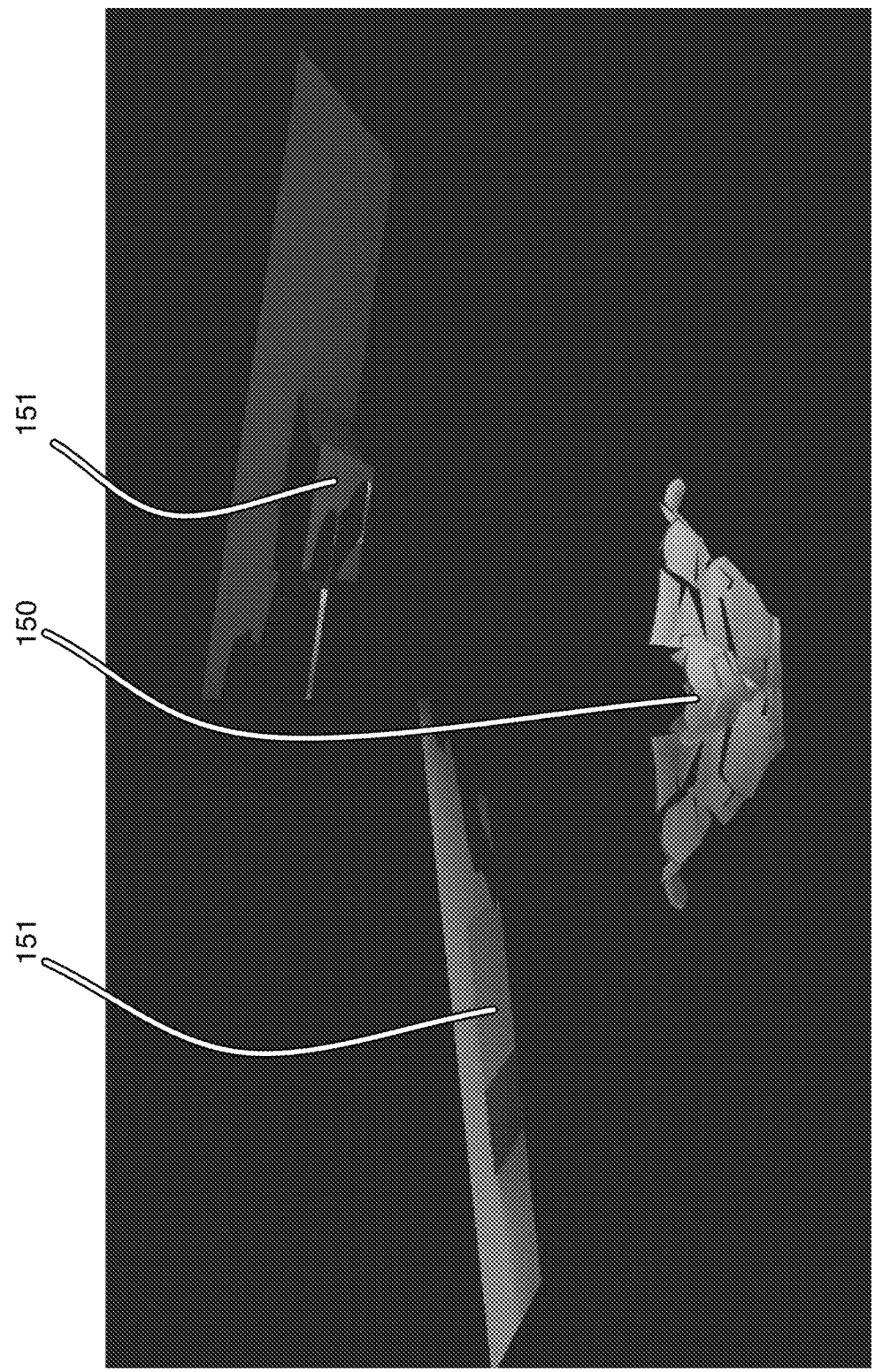

FIGS. 8A-C illustrate a perspective, side and top view of perfect error-free depth applied to planes and/or masks of areas or regions associated with the two-dimensional input image. If error free depth maps are obtained by the system, then applying the masks of FIG. 4 results after calculation of plane rotations for example results in a readily editable image.

Figure 8D:
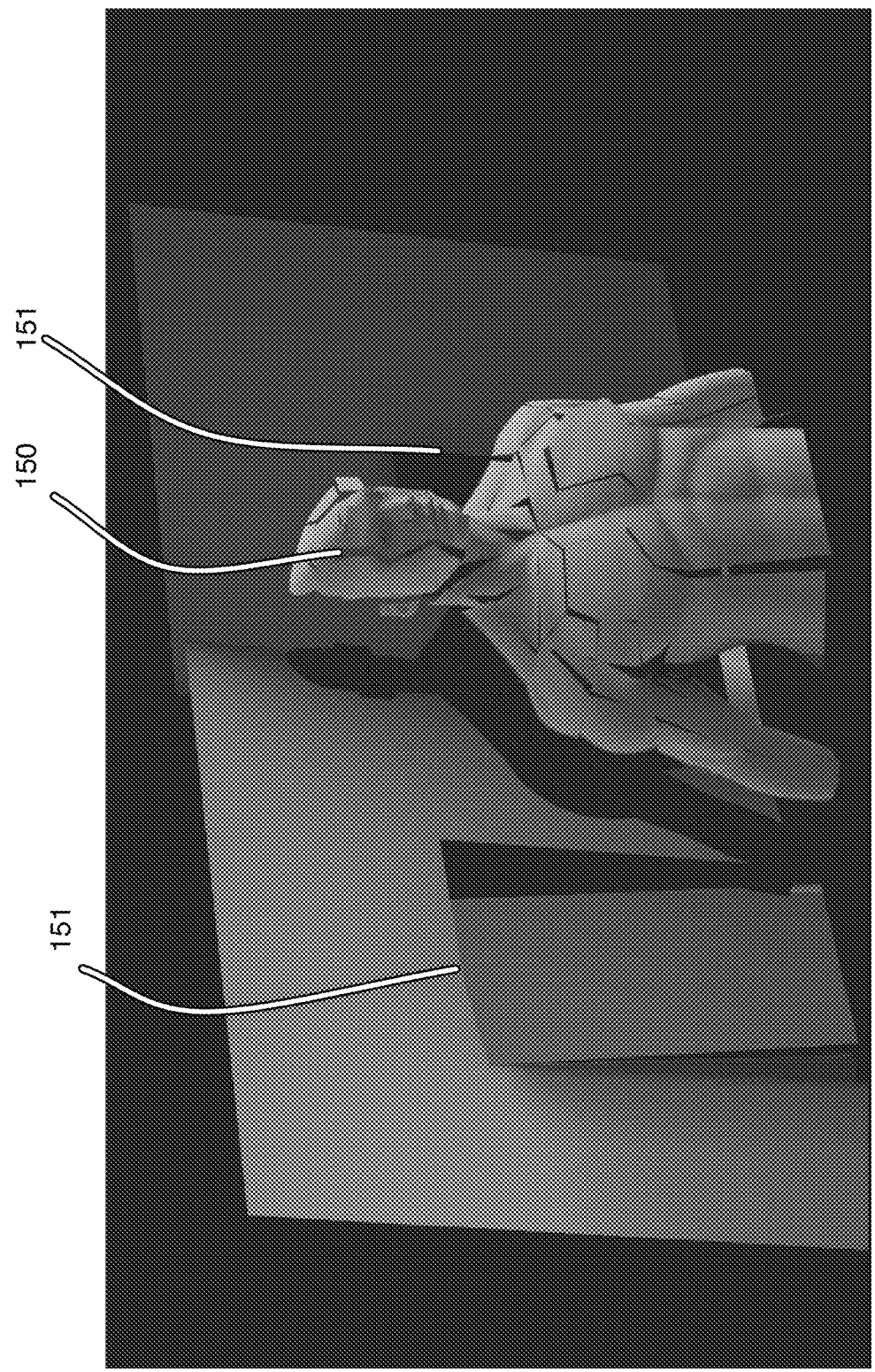
Figure 8E:
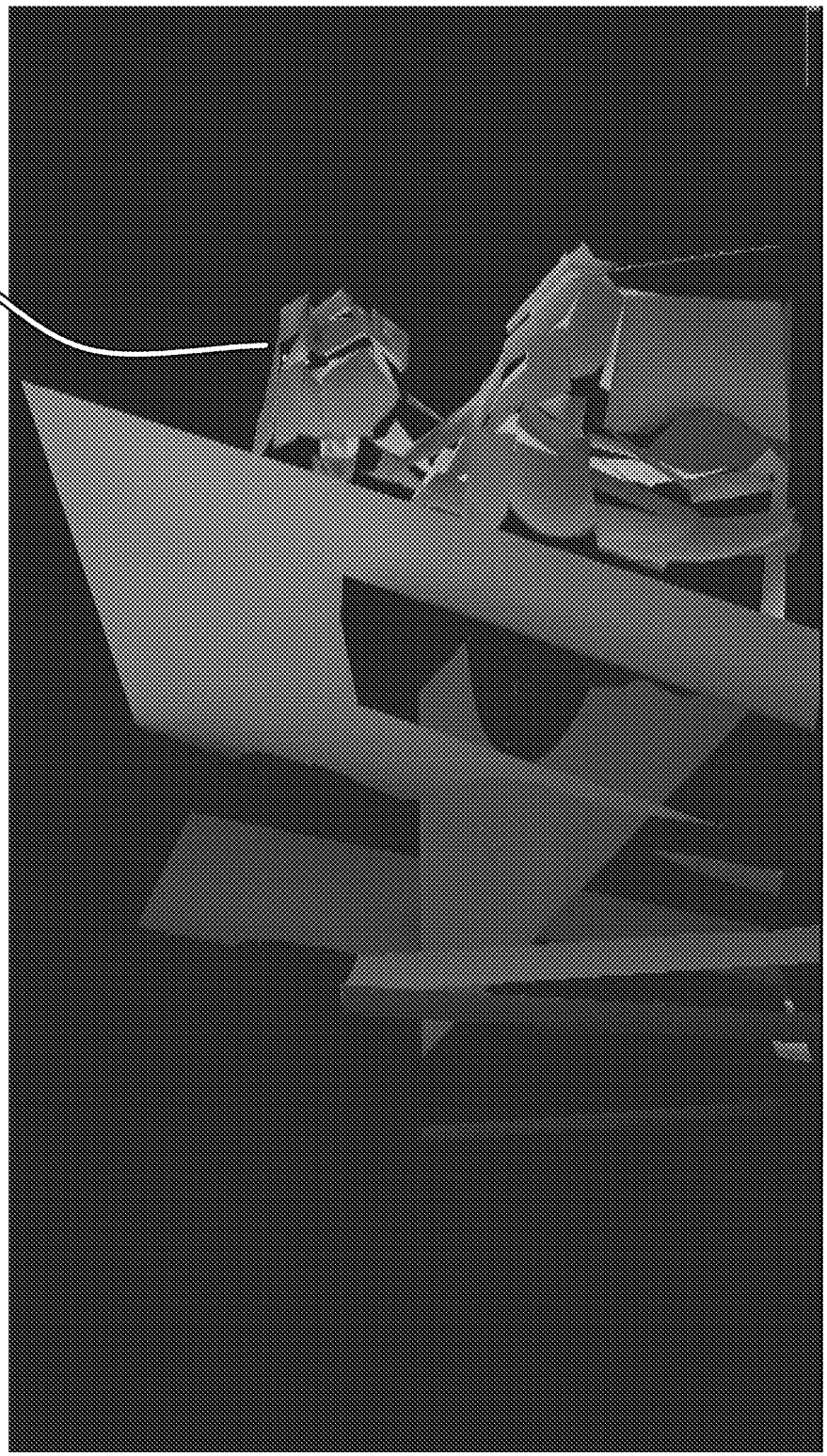

FIGS. 8D-F illustrate a perspective, side and top view of imperfect typical depth acquired from an external depth capture apparatus or system and applied to planes and/or masks of areas or regions associated with to the two-dimensional input image. As shown, many of the errors of shown in FIGS. 7D-F are entirely or nearly entirely eliminated which enables rapid adjustment of depth of correction of depth errors if at all depending on the quality requirements of the particular project. For example, through calculation of best fit planes (whether flat or curved) at 203 as detailed above with respect to FIG. 2, many of the errors are minimized or otherwise averaged away.

Whether using a perfect depth map that is error free or not, embodiments of the invention may also include calculating the best fit for a plane using a computer based on depth associated with the at least one area associated with each of the at least one mask by calculating a normal vector for the plane, or a regression fit for the plane, or an orthogonal distance regression fit for the plane, or in any other known manner regarding fitting a plane to particulars points in three-dimensional space. Specifically, embodiments of the invention mold depth data to eliminate depth errors by transforming large numbers of depth values to smaller number of plane rotations. In one embodiment, the system may calculate the normal and position for a specific region, for example to form an average, rotation value associated with a plane that represents a large group of depth values, some of which may be erroneous. Hence, issues associated with imperfect depth map data are often averaged out, or otherwise eliminated. In some extreme cases of noisy depth data, these issues may not be fully resolved, however, embodiments of the invention reduce the problem to a manageable number of editable parts, and enable the issues to be rapidly and easily corrected automatically or by accepting inputs from an artist. Although embodiments of the invention may utilize a normal vector approach, other algorithms may be utilized alone or in combination to achieve similar or advantageous results. For example, embodiments of the invention may treat each pixel as a point in space, e.g., wherein X and Y represent the position of the pixel and Z represents the Z-Depth value of that pixel, and isolate only the points within the defined region, and calculate the "best-fit" plane for that group of points. Embodiments of the invention may utilize any type of plane fitting algorithm including but not limited to regression plane, orthogonal distance regression plane, etc. Commonly available statistics toolboxes include orthogonal regression using principal components analysis for example that may be utilized as off the shelf software components for calculation of best fitting planes to a number of points for example to minimize the perpendicular distances from each of the points to a plane. Embodiments of the invention may utilize any type of filtering as part of the transformation processing including but not limited to dilation and erosion. In one or more embodiments, an algorithm that iterates over a set of depth slopes and averages the slopes over an area for example is one example of an algorithm that may be utilized to calculate the normal vector for a particular area of the depth map.

Figure 9B:
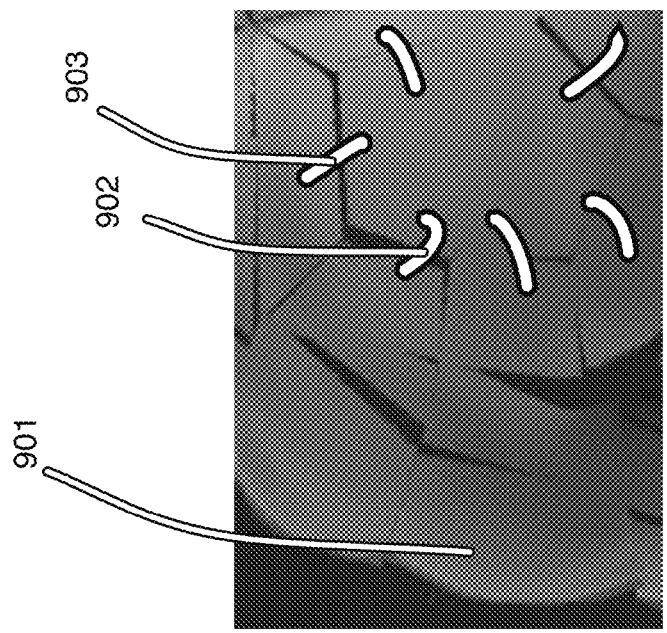
FIG. 9B illustrates a close-up view of a portion of FIG. 9B showing plane grouping with or without minimum and maximum connections and with or without spring attachments having a spring constant for example.
Figure 9A:
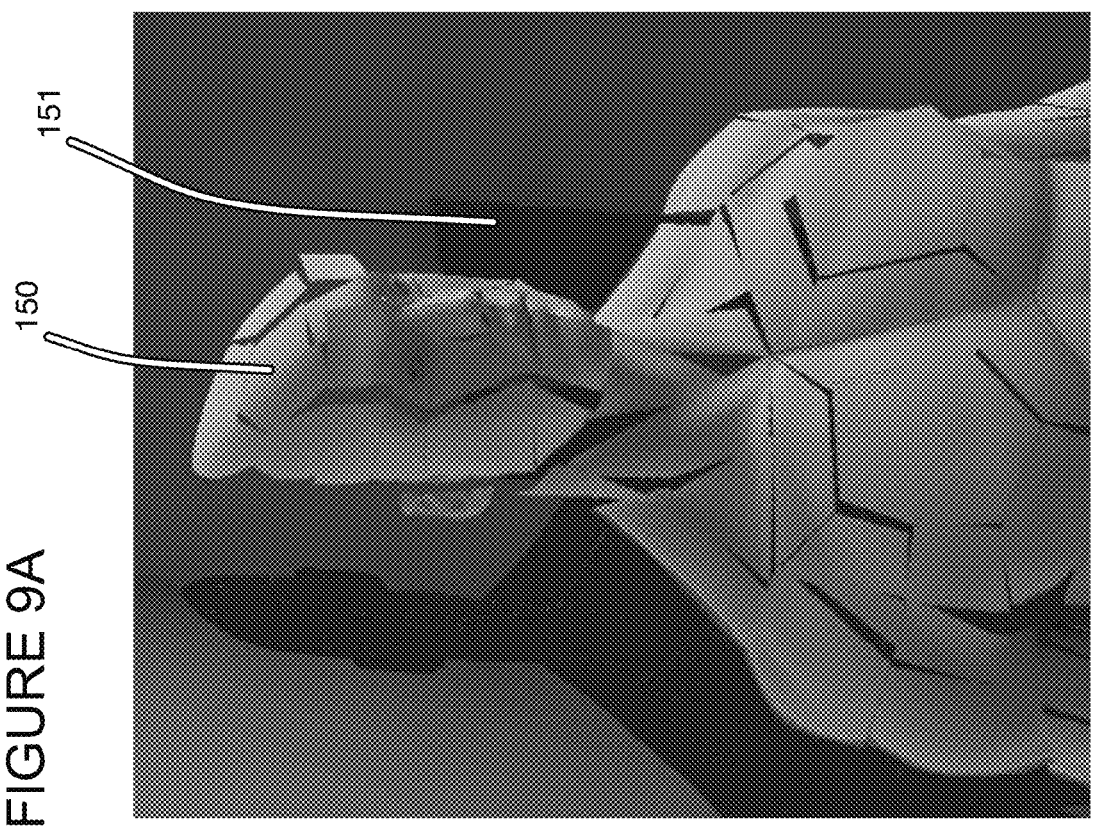
FIG. 9A illustrates a close-up view of the imperfect typical transformed into rotated planes which may or may not be flat planes, or curved planes or surfaces and which yield a manageable set of information that enables correction of the errors automatically by the system or through manual artist input accepted and processed by the system.

FIG. 9A illustrates a close-up view of the imperfect typical transformed into rotated planes which may or may not be flat planes, or curved planes or surfaces and which yield a manageable set of information that enables correction of the errors automatically by the system or through manual artist input accepted and processed by the system. As shown, even with a high degree of erroneous depth data, the masks are low in number, and thus are far easier to adjust to correct depth associated with the two-dimensional image.

FIG. 9B illustrates a close-up view of a portion of FIG. 9B showing plane grouping with or without minimum and maximum connections and with or without spring attachments having a spring constant for example. In one or more embodiments, plane grouping may be visibly shown and editable to enable grouped planes to be repositioned by accepting a drag or other user input wherein the couplings 902 and 903 thus pull or otherwise drag or reposition attached planes. Any algorithm such as an iterative algorithm for moving attached planes with minimum and maximum coupling distances or spring constants is in keeping with the spirit of the invention. One such method iterates over each coupling after accepting a user move and moves each attached plane. If a coupling is maximized then the grouped planes move as well. If the couplings have a spring constant $F=k*x$, then a force may be imparted on the other planes, which may have masses associated with them for example based on size to visually show non-rigid coupling moves of multiple grouped planes.

Alternatively or in combination, embodiments of the invention may include altering automatically any combination of position, orientation, shape, depth or curve of said plane in order to fit edges or corners of the plane with another plane. This enables a plane to be positioned in three-dimensional space, rotated in three-dimensions, reshaped by moving a corner point, warped in effect by adding depth or a curve to the plane, for example to add depth to the plane itself to match the underlying image data. Embodiments of the invention may also include accepting an input to alter any combination of position, orientation, shape, depth or curve of the plane, for example to artistically fit the underlying image data, correct errors or artifacts from the automated fitting process for touch up, etc.

Embodiments of the invention generally also include applying depth associated with the plane having the best fit to the at least one area to shift pixels in the two-dimensional image horizontally to produce a stereoscopic image or stereoscopic image pair. Any type of output that is capable of providing different left and right eye information is in keeping with the spirit of the invention.

One or more embodiments of the invention may use external depth information incorporated into a 3D model of one more objects that appear in a scene. A 3D object model may for example provide depth for the portions of an object, rather than for an entire image or an entire sequence of frames in a video. By locating and orienting the 3D object model in each image or frame, one or more embodiments may simplify the task of generating a depth map for an entire image or for an entire video.

FIG. 10 illustrates a flowchart of an embodiment of a method that uses a 3D object model to convert a 2D video to a 3D video. A 2D video 1001 is obtained in step 1000. The video 1001 may contain one or more scenes, where a scene is for example associated with a particular location for a shot. In step 1010 a 3D space 1011 is defined for one of the scenes of the video 1001. This 3D space may for example define a coordinate system for the location of the scene. To convert a 2D video 1001 to 3D, objects in the scene must be located in this 3D space 1011. Techniques known in the art for 2D to 3D conversion often require manual depth assignment to every pixel or to every region of each frame. This process is time-consuming and labor-intensive. In some situations, significant efficiencies may result from modeling the 3D shape of one or more objects once, and applying these 3D object models across frames. In the embodiment of FIG. 10, a 3D object model 1021 is obtained. One or more embodiments may obtain any number of 3D object models. 3D object models may be obtained from any source and in any format. For example, without limitation, 3D object models may comprise point clouds, polygonal models, depth maps, disparity maps, parallax maps, parameterized surfaces such as NURBS surfaces, or 3D models in any of the file formats used in the art such as for example 3DS, FBX, OBJ, STEP, STL, DAE, X3D, BLEND, or others. In one or more embodiments 3D object models may be combinations of any of the previous examples or of any other 3D model formats.

In step 1030 the frames containing the object are identified. For example, in FIG. 10, frames 1031, 1032 and 1033 of video 1001 contain images of the object with 3D object model 1021. In one or more embodiments frames containing the object or objects of interest may be determined manually. In one or more embodiments frames containing the object or objects of interest may be determined automatically using a computer. For each of these frames the embodiment shown in FIG. 10 uses the 3D object model 1021 to convert the frame to 3D. In step 1040, the object position and orientation in the frame is determined. This results in placing the object model 1021 in 3D space 1011, resulting in transformed object model 1041. From this transformed 3D object model 1041, step 1050 generates a depth map 1051 for the object in the frame. Depth map generation from the transformed 3D object model is a straightforward calculation since the location of each point of the object is known in the 3D space 1011. In step 1060, depth 1061 is assigned to additional elements, if any, in the frame. In one or more embodiments multiple objects of interest may exist in a frame, and multiple 3D object models may be applied to the frame to generate individual object depth maps; these individual object depth maps may then be combined into an overall depth map. In one or more embodiments additional 3D modeling or depth editing steps may be used to complete the depth map for a frame. In one or more embodiments the 3D object model may comprise the entire frame, so that additional depth map generation is not required. In step 1070, a stereoscopic image pair is generated from the frame; this image pair comprises left image 1071 and right image 1072. Using techniques known in the art, pixels may be shifted horizontally between the left and right images based on the depth map 1061. One or more embodiments may use any technique known in the art to generate stereoscopic image pairs from depth maps or from other 3D model information. For example, one or more embodiments may use any of the techniques known in the art for filling of gaps created by pixel shifting.

Figure 11:
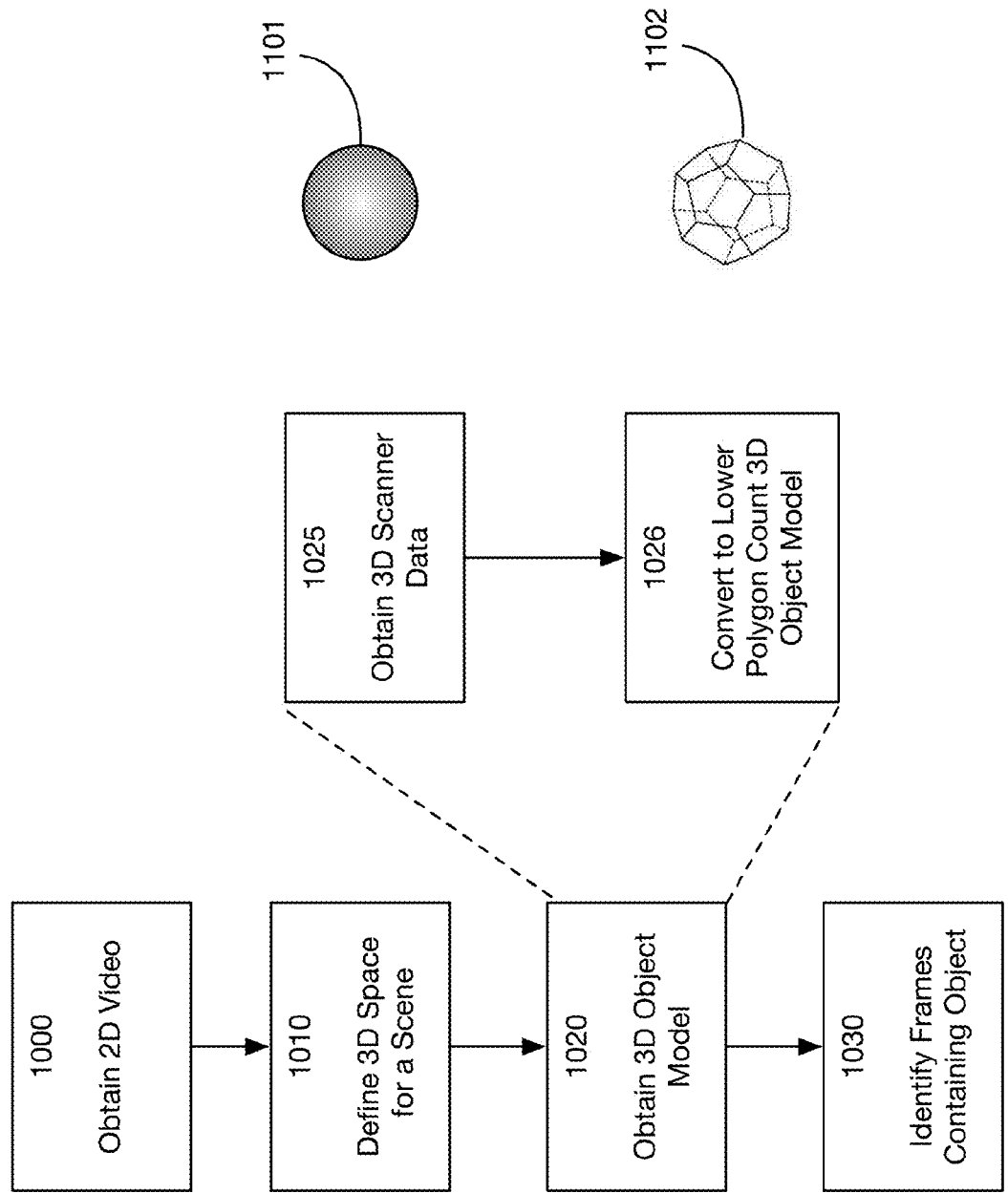
FIG. 11 illustrates an embodiment of the method shown in FIG. 10, where the 3D object model is obtained from 3D scanner data captured from the object.

One or more embodiments may obtain one or more 3D object models from any source or sources and in any format or formats. One potential source for 3D object models is 3D scanner data. 3D scanner data may for example be obtained from an object and converted into a 3D object model used for 2D to 3D conversion. Any object may be used to generate a 3D object model, such as for example, without limitation, a person, a group of persons, an animal, an inanimate object, a machine, a building, a vehicle, a computer-generated figure, or a physical model of any other object. FIG. 11 illustrates an embodiment of this method. Step 1020, obtain 3D object model, comprises two steps: step 1025 obtains 3D scanner data 1101 of an object, and step 1026 converts this 3D scanner data to a lower polygon count 3D object model 1102. 3D scanner data may be obtained using any 3D scanning technology. Technologies known in the art include for example contact and non-contact methods. Non-contact methods include for example laser time-of-flight methods, laser triangulation methods, holographic methods, and structured light methods. Any or all of these methods, or any other 3D scanning methods, may be used as part of the process of obtaining a 3D model of an object. Embodiments may obtain 3D scanner data in any format, including for example, without limitation, point clouds, polygonal models, NURBS surface models, or 3D models in any of the formats known in the art. One or more embodiments may use 3D scanner data directly as a 3D object model. One or more embodiments may convert 3D scanner data to a different format. For example, a point cloud may be converted to a polygon model or a parameterized surface model using techniques known in the art. One or more embodiments may convert 3D scanner data to a lower polygon count 3D model for efficiency of processing, as illustrated in step 1026. Reducing the polygon count of a 3D model is known in the art as retopologizing; one or more embodiments may use any retopologizing methods or technologies known in the art to convert 3D scanner data or other 3D models to a lower polygon count 3D model. One or more embodiments may use 3D models that comprise parameterized surfaces, such as NURBS surfaces for example, instead of or in addition to polygons.

Figure 12:
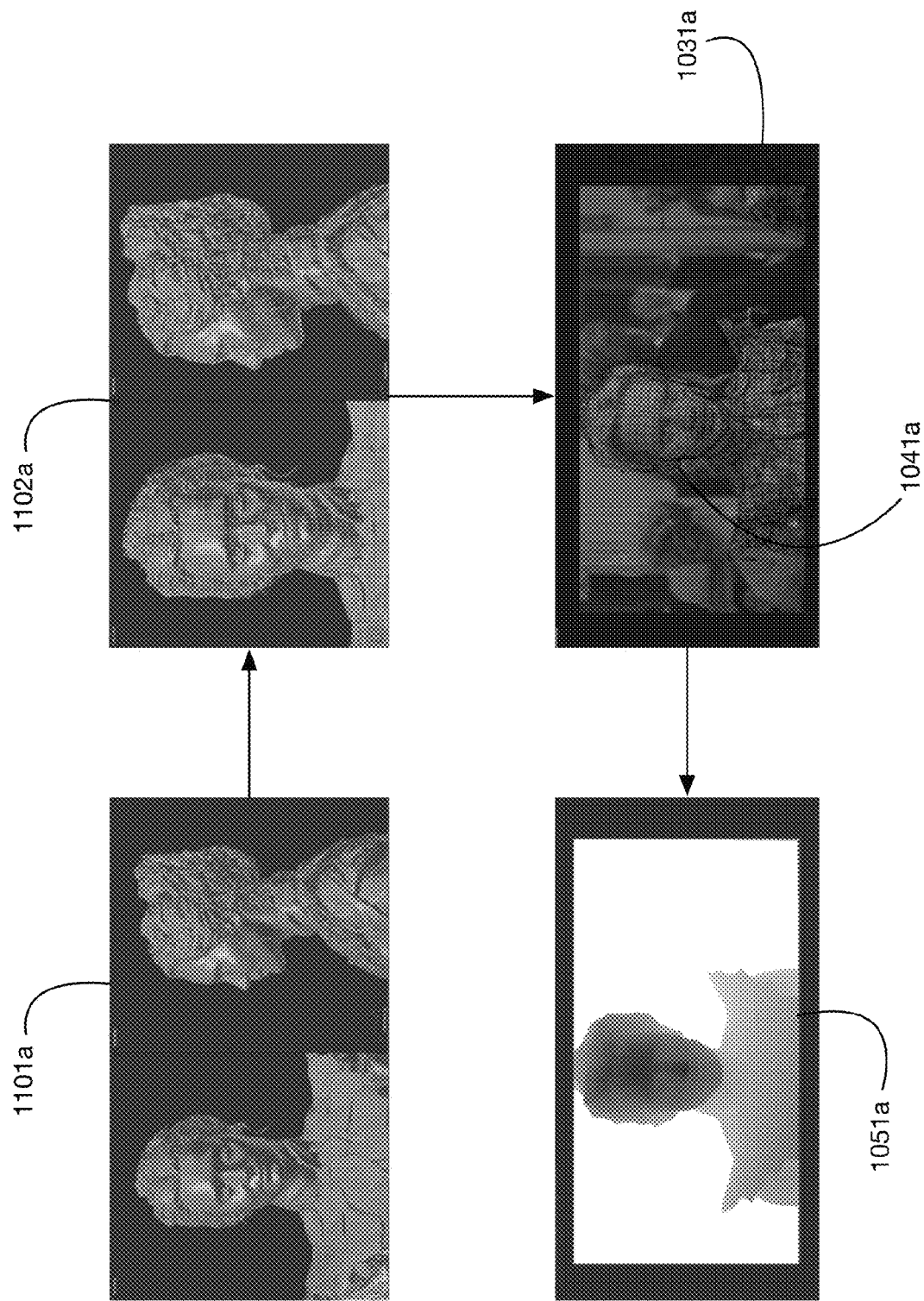
FIG. 12 illustrates an example of steps from FIG. 11 applied to a particular object in a video frame; 3D scanner data is converted to a polygon model, which is located in a frame, and the model is converted to a depth map.

FIG. 12 illustrates an example of selected steps of the embodiments shown in FIGS. 10 and 11. A 3D scanner model 1101a is obtained of an object, as in step 1025 of FIG. 11. This 3D scanner model may for example comprise a very large number of polygons, which may for example have been generated from a point cloud from a 3D scanner. This 3D scanner model is converted to a lower polygon 3D model 1102a, shown as an overlay on the 3D scanner model, as in step 1026 of FIG. 11. The model 1102a is located and oriented at position and orientation 1041a in frame 1031a; this step overlays and aligns the 3D object model onto the image of the character in the frame. From this model 1041a situated and oriented in the 3D space associated with the scene, depth map 1051a is generated for the character. Here depth has not yet been assigned to other elements of the scene in the frame, as indicated by the white background surrounding the character. This process of aligning the 3D model 1102a with the image of the character in the frame may be repeated for every frame in the scene containing the character. This use of the 3D model therefore greatly facilitates depth map generation for the scene.

Figure 13:
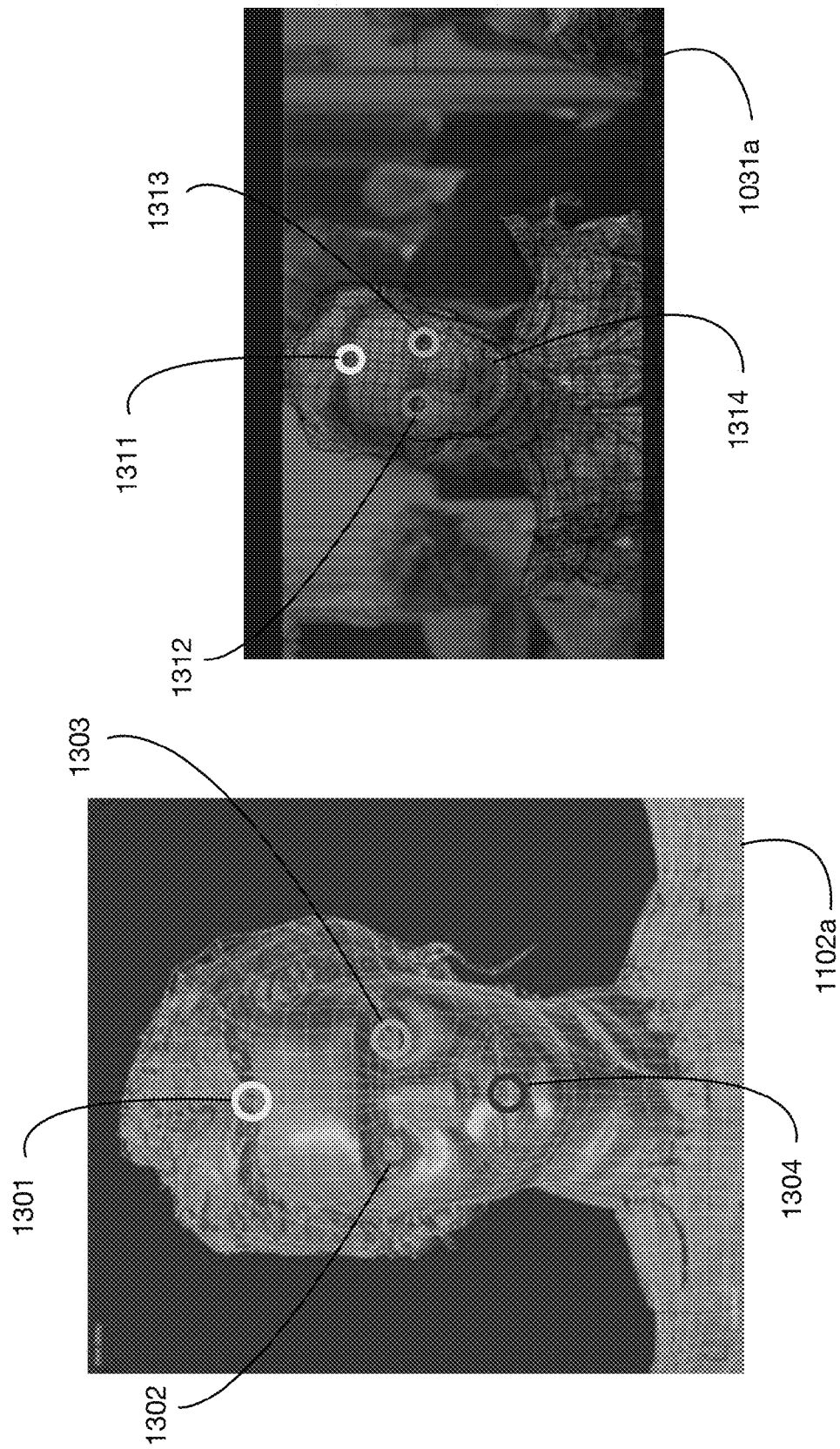
FIG. 13 illustrates an embodiment of a method for determining the position and orientation of a 3D object model in a frame by aligning features of the 3D model with corresponding pixels in the frame.

One or more embodiments may use any technique or techniques to determine the position and orientation of a 3D object model in a frame. These techniques may be manual, automated, or a combination of manual and automated techniques. FIG. 13 illustrates an embodiment of a method that aligns a 3D object model with an image using one or more features. Features may be for example points or regions within an object model that have distinguishing shapes, corners, lines, textures, colors, or other characteristics. In the example shown in FIG. 13, four features 1301, 1302, 1303, and 1304 are selected in the 3D object model. These features are located in frame 1031a at pixel coordinates 1311, 1312, 1313, and 1314, respectively. The correspondence between feature positions in the 3D object model and the corresponding pixel coordinates in the frame allows the position and orientation of the object model in the 3D space to be calculated. Techniques for recovering an object pose from the pixel coordinates of its features are known in the art. In general, a unique object pose may be determined from the pixel coordinates of 4 features. For arbitrary numbers of feature points these techniques are known in the art as solutions to the "Perspective-n-Point problem," since they recover the object pose from the projection of n points (features) of the object onto an image plane. For more than 4 features, object pose may be overdetermined, in which case many techniques perform an error minimization to best align an object pose with the projection of the features onto an image. See for example: D. DeMenthon and L. Davis (1995). Model Based Object Pose in 25 Lines of Code. International Journal of Computer Vision, 15(1-2), 123-141. One or more embodiments may use any of the techniques known in the art to obtain or calculate the position and orientation of a 3D object model from the pixel location of any number of model features in an image projection in a frame.

Figure 14:
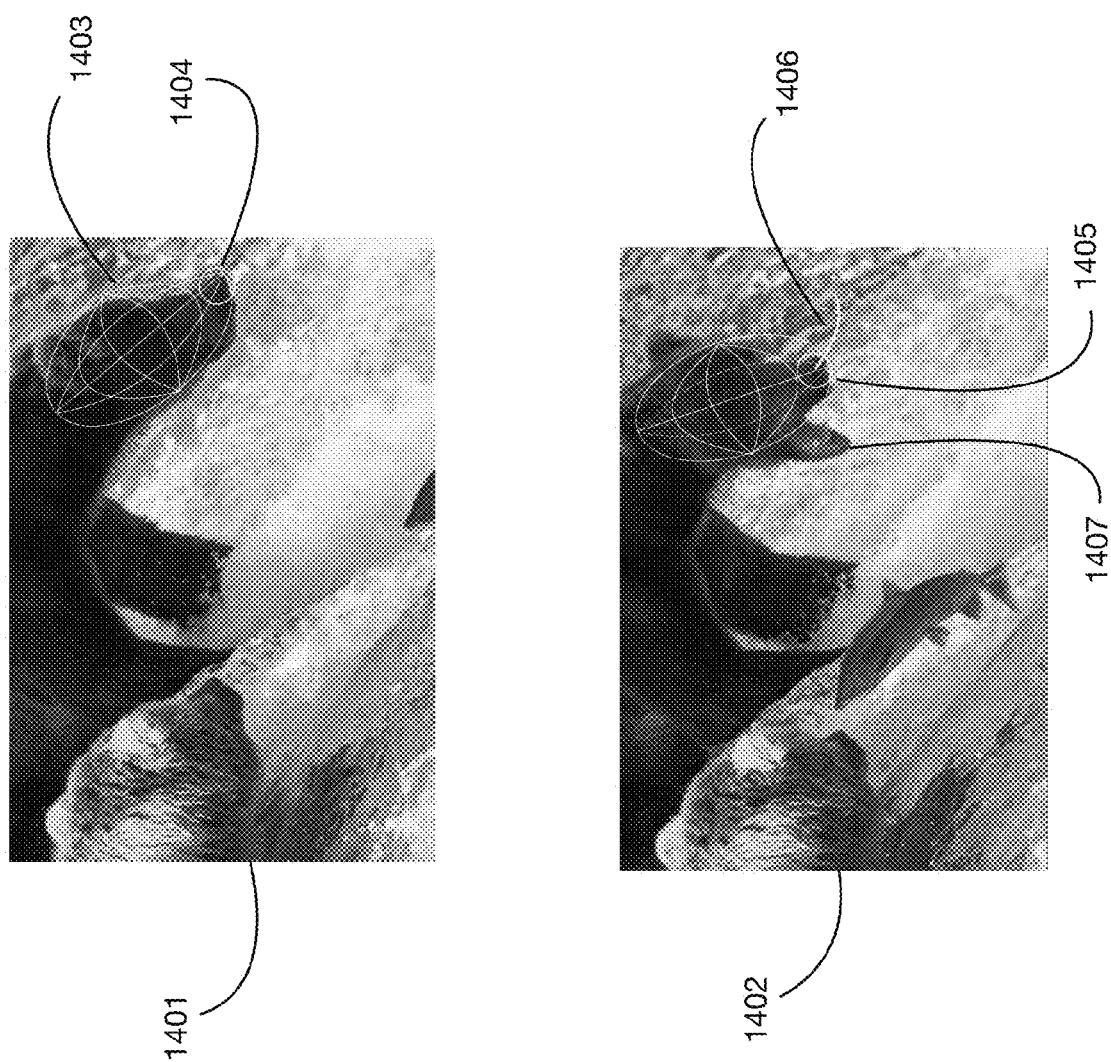
FIG. 14 illustrates an embodiment of a method for tracking features across frames to propagate 3D model position and orientation from a key frame to other frames.

One or more embodiments may locate 3D object model features in one or more frames manually, automatically, or using a combination of manual and automated methods. FIG. 14 illustrates an embodiment that tracks a feature across frames using manual alignment in a key frame with automated tracking of a feature in non-key frames. In this example a 3D object model 1403 of the head of a grizzly bear is obtained, and a feature is selected that corresponds to the tip of the bear's nose. In key frame 1401 the feature is manually located at pixel location 1404 for example by an operator. In non-key frame 1402 the pixel location 1405 of the feature is located automatically by searching pixels for characteristics corresponding to the feature. Techniques for automatic feature tracking are known in the art; one or more embodiments may use any known techniques for tracking features of a 3D object model across frames. Feature track 1406 indicates how the feature pixel location moves across frames. The orientation and position of the 3D object model 1403 in each frame may be determined by tracking multiple features, as described above.

Figure 15:
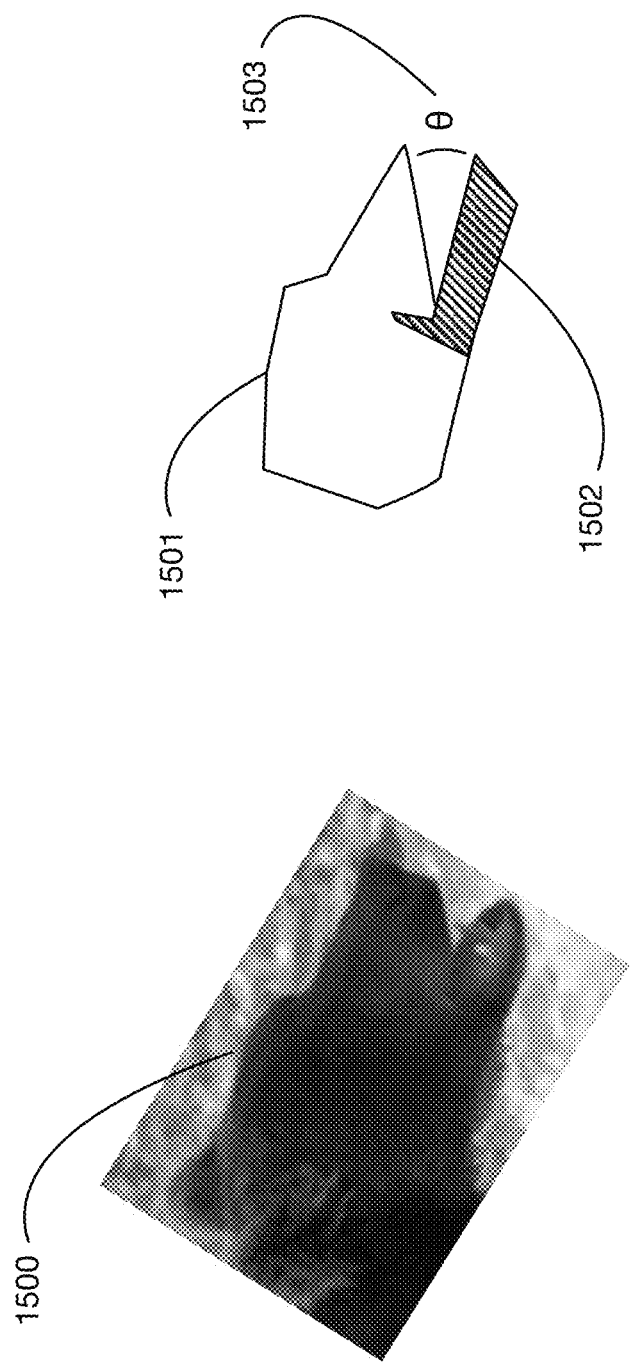
FIG. 15 illustrates an embodiment of a 3D object model that has been rigged with a degree of freedom for a movable joint.

FIG. 14 illustrates a potential issue with a rigid 3D object model. While the object model 1403 matches the object (the bear's head) fairly well in the key frame 1401, in frame 1402 the bear's open jaw 1407 causes the model to deviate from the image. One or more embodiments may use 3D object models with degrees of freedom, for example for movable joints, to match object images for non-rigid objects. FIG. 15 illustrates a simplified object model for the bear 1500 that incorporates a degree of freedom for the jaw. (Here the model is shown in 2 dimensions for ease of illustration.) The object model is divided into two object model parts 1501 and 1502; each part is rigid, but the parts may move relative to one another. In this illustrative example there is a single rotational degree of freedom 1503 between the two parts, which represents the angle of the jaw. In one or more embodiments, a 3D object model may be modified to incorporate multiple object parts and degrees of freedom for relative motion of the parts. This process is known in the art as rigging the 3D object model. One or more embodiments may incorporate one or more rigging steps into the method to account for potential degrees of freedom in the object.

Figure 16:
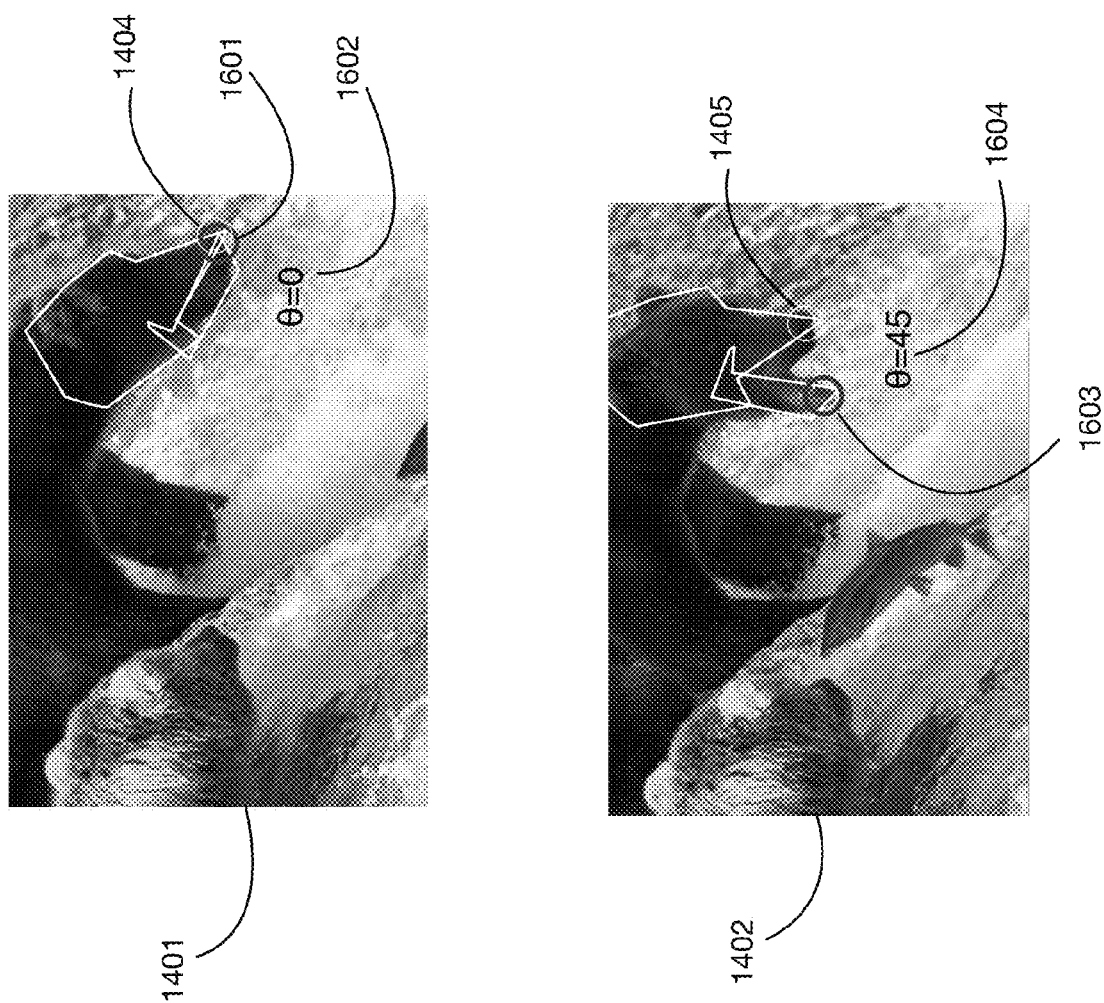
FIG. 16 illustrates tracking the 3D object model of FIG. 15 across frames.

With a rigged 3D object model, aligning the object model with an image in a frame involves positioning and orienting each part of the model. In general, this alignment determines an overall position and orientation for the model, along with values for each degree of freedom. One or more embodiments may use manual, automated, or mixed methods to determine the model orientation and position and the values of each degrees of freedom in any frame. One or more embodiments may manually set the values for each degree of freedom in one or more key frames, and use automated or semi-automated methods to determine these values in non-key frames. For example, one or more embodiments may automatically interpolate values for degrees of freedom between key frames. One or more embodiments may use features on each or a subset of the model parts, and use automated feature tracking for the parts to determine values for the degrees of freedom. FIG. 16 illustrates this process for the example frames shown in FIG. 14, using the rigged 3D object model from FIG. 15. In key frame 1401 an operator aligns the 3D object model with the image and sets the rotational degree of freedom 1602 to zero, representing the closed jaw of the bear. A feature is selected for each part of the model; feature 1404 is the tip of the nose, as before, and feature 1601 is the front tip of the lower jaw for the bottom part of the model. In the key frame these features are adjacent. Automated feature tracking then tracks these features to the non-key frame 1402; feature 1404 moves to location 1405, and feature 1601 moves to location 1603. From these new feature positions, the rotation degree of freedom 1604 may be automatically calculated.

Figure 17:
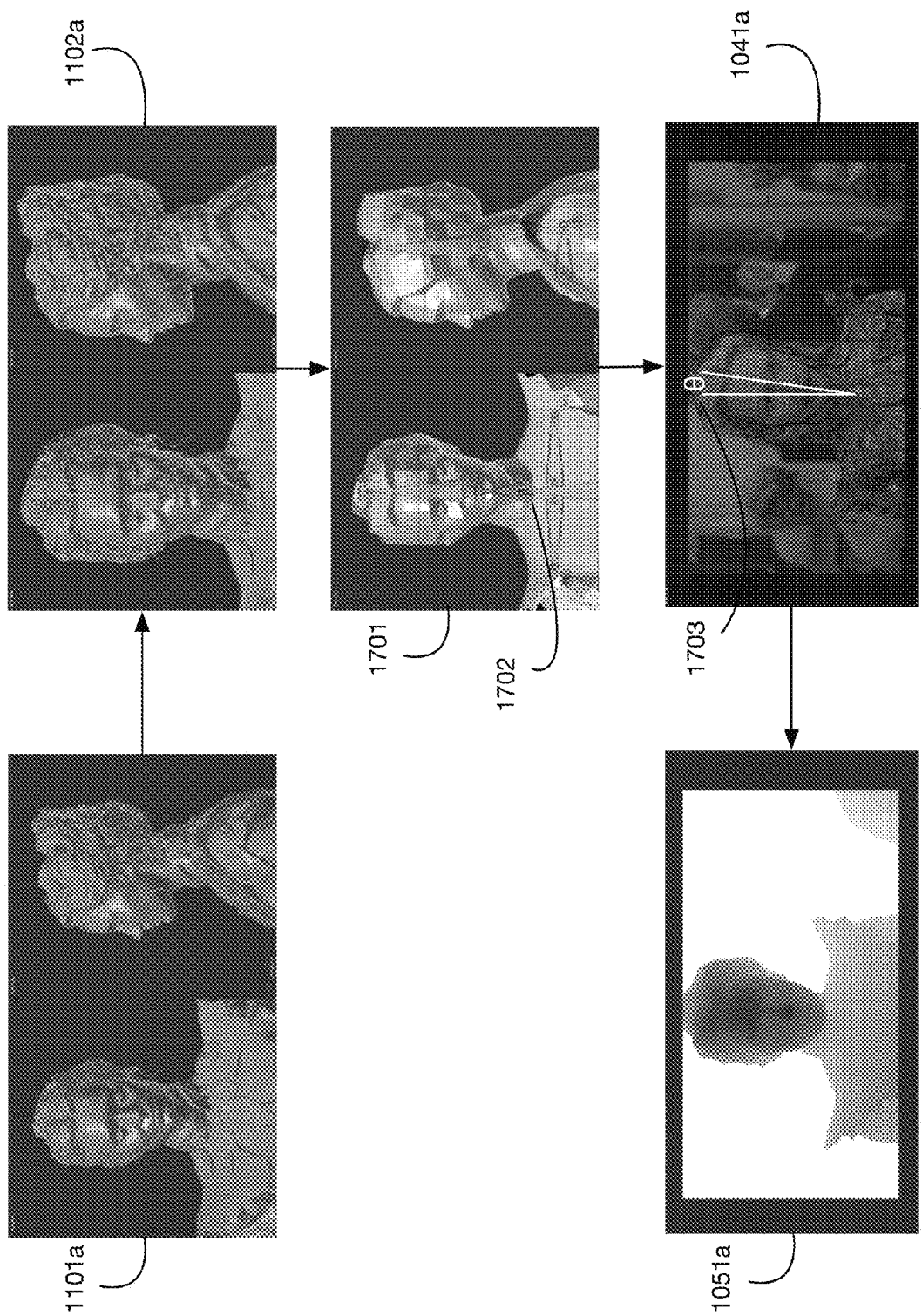
FIG. 17 illustrates an extension to the example shown in FIG. 12, with degrees of freedom added to the 3D object model.

FIG. 17 illustrates a rigged 3D object model applied to the example from FIG. 12. The static 3D object model 1102a is rigged to generate a rigged 3D object model 1701, with degrees of freedom added for the possible motion of the character's joints. For example, degree of freedom 1702 represents potential tilting of the neck. In frame 1041 a, the value 1703 for this neck tilt is calculated. This value may be set manually by an operator to align the model parts with the image or as discussed above it may be determined automatically using for example feature tracking of features for the individual model parts.

Figure 18:
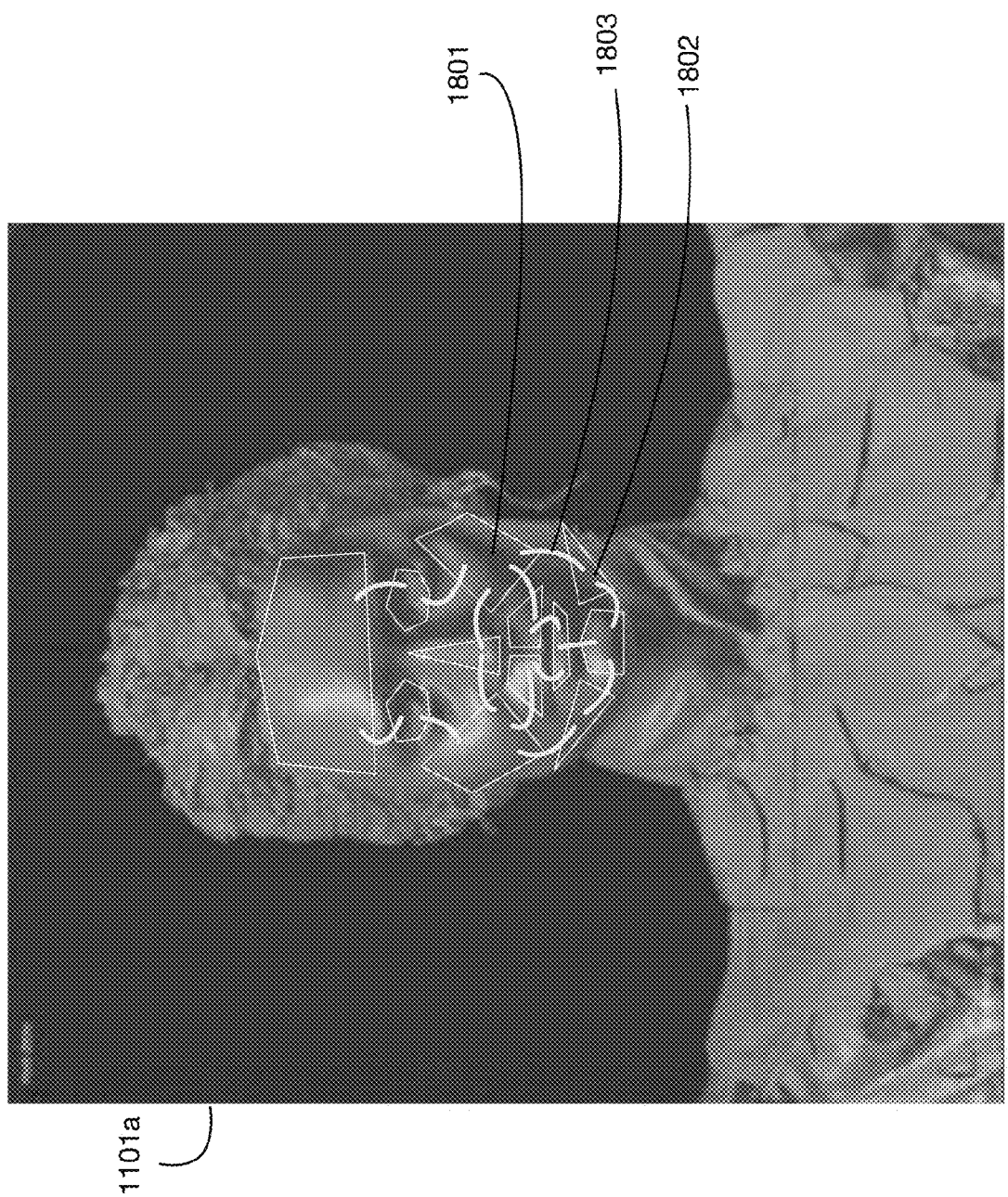
FIG. 18 illustrates an example of converting 3D scanner data to a planar model using planes fit to the points and links between the planes for constraints on plane boundaries.

In converting 3D scan data to a 3D object model, one or more embodiments may fit one or more planes to the scan data using any or all of the techniques described above. FIG. 18 illustrates an example of an embodiment that generates planes to fit 3D scan data 1101a. For example, plane 1801 is fit to the cheek, plane 1802 is fit to the jaw, and a link 1803 is defined between these two planes. The link may for example define minimum and maximum distances or angles, or a spring constant. Planes may be fit automatically to the data using constraints defined by the links. After the initial fit, the edges, angles, or normal of the planes may for example be adjusted to fit the edges or corners of the planes with one another to eliminate gaps or misalignments in the resulting 3D object model.

While the invention herein disclosed has been described by means of specific embodiments and applications thereof, numerous modifications and variations could be made thereto by those skilled in the art without departing from the scope of the invention set forth in the claims.

What is claimed is:

1. A method of converting 2D video to 3D video using 3D object models, comprising:
obtaining a 2D video;
defining a 3D space associated with a scene in said 2D video;
obtaining a 3D object model of an object viewable in said scene;
identifying one or more frames in said scene, each containing an image of at least a portion of said object;
defining a position and orientation of said 3D object model in said 3D space that aligns said 3D object model with the image of said at least a portion of said object in a frame of said one or more frames;
generating a depth map associated with the frame from said 3D object model positioned and oriented in said 3D space;
assigning depth values in said depth map to other elements in said scene;
generating a stereoscopic 3D image pair from the frame and from said depth map.

2. The method of claim 1, wherein said obtaining a 3D object model of said object comprises
obtaining 3D scanner data captured from said object; and,
converting said 3D scanner data into said 3D object model.

3. The method of claim 2, wherein said obtaining said 3D scanner data comprises obtaining data from a time-of-flight system or a light-field system.

4. The method of claim 2, wherein said obtaining said 3D scanner data comprises obtaining data from a triangulation system.

5. The method of claim 2, wherein said converting said 3D scanner data into said 3D object model comprises
retopologizing said 3D scanner data to form said 3D object model from a reduced number of polygons or parameterized surfaces.

6. The method of claim 1 wherein said defining a position and orientation of said 3D object model in said 3D space comprises
selecting one or more features in said 3D object model, each having a coordinates in said 3D object model;
determining pixel locations of said one or more features in said one or more frames;
calculating said position and orientation of said 3D object model in said 3D space to align a projection of said coordinates in said 3D object model onto a camera plane with said pixel locations in a plurality of frames of said one or more frames.

7. The method of claim 6 wherein said determining pixel locations of said one or more features in said one or more frames comprises
selecting said pixel locations in one or more key frames;
tracking said features across one or more non-key frames using a computer.

8. The method of claim 1 further comprising
dividing said 3D object model into object parts, wherein said object parts may have motion relative to one another;
augmenting said 3D object model with one or more degrees of freedom that reflect said motion relative to one another of said object parts;
determining values of each of said one or more degrees of freedom that align said image of said at least a portion of said object in a plurality of frames of said one or more frames with said 3D object model modified by said values of said one or more degrees of freedom.

9. The method of claim 8 wherein said determining values of each of said one or more degrees of freedom comprises
selecting one or more features in each of said object parts, each having coordinates in said 3D object model;
determining pixel locations of said one or more features in said one or more frames;
calculating a position and orientation of one of said object parts and calculating said values of each of said one or more degrees of freedom to align a projection of said coordinates in said 3D model onto a camera plane with said pixel locations in the frame.

10. The method of claim 9 wherein said determining pixel locations of said one or more features in said one or more frames comprises
selecting said pixel locations in one or more key frames;
tracking said features across one or more non-key frames using a computer.

11. The method of claim 2, wherein said converting said 3D scanner data into said 3D object model comprises
obtaining at least one mask associated with at least one area within said 3D scanner data;
calculating a best fit for one or more planes using a computer based on said 3D scanner data associated with the at least one area associated with each of the at least one mask;
altering automatically using said computer, one or more of position, orientation, shape, depth or curve of said one or more planes in order to fit edges or corners of said one or more planes with another plane;
generating said 3D object model from said one or more planes.

12. The method of claim 11, wherein said generating said 3D object model from said one or more planes comprises
generating a high resolution 3D object model from said one or more planes;
retopologizing said high resolution 3D object model to form said 3D object model from a reduced number of polygons or parameterized surfaces.

13. The method of claim 11, wherein the obtaining at least one mask associated with at least one area within said 3D scanner data comprises automatically generating the at least one mask comprising the at least one area wherein the at least one area is over a predefined size and within a predefined depth range.

14. The method of claim 11, wherein the obtaining at least one mask associated with at least one area within said 3D scanner data comprises automatically generating the at least one mask comprising the at least one area wherein the at least one area comprises a boundary having a difference in luminance values over a predefined threshold.

15. The method of claim 11, wherein the calculating the best fit for one or more planes using a computer based on said 3D scanner data associated with the at least one area associated with each of the at least one mask comprises calculating a normal vector for the one Or more planes.

16. The method of claim 11, wherein the calculating the best fit for one or more planes using a computer based on said 3D scanner data associated with the at least one area associated with each of the at least one mask comprises calculating a regression fit for the one or more planes.

17. The method of claim 11, wherein the calculating the best fit for one or more planes using a computer based on said 3D scanner data associated with the at least one area associated with each of the at least one mask comprises calculating an orthogonal distance regression fit for the one or more planes.

18. The method of claim 11, wherein said one or more planes comprise a plurality of planes and wherein the method further comprises grouping two or more of said plurality of planes.

19. The method of claim 18, wherein each of said two or more planes are grouped with a link of a predefined minimum and maximum distance or with a link having a spring constant.

20. The method of claim 11, further comprising accepting an input to alter any combination of position, orientation, shape, depth or curve of said one or more planes.

* * * * *